US012427523B2

(12) United States Patent
Clay et al.

(10) Patent No.: US 12,427,523 B2
(45) Date of Patent: Sep. 30, 2025

(54) BACTERIAL ENDOTOXIN READER VERIFICATION PLATES AND METHODS OF USE

(71) Applicant: BL TECHNOLOGIES, INC., Minnetonka, MN (US)

(72) Inventors: Brian Clay, Minnetonka, MN (US); Stan Needle, Louisville, CO (US); Krzysztof Franaszczuk, Superior, CO (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 806 days.

(21) Appl. No.: 17/777,931

(22) PCT Filed: Nov. 18, 2020

(86) PCT No.: PCT/US2020/061082
§ 371 (c)(1),
(2) Date: May 18, 2022

(87) PCT Pub. No.: WO2021/102017
PCT Pub. Date: May 27, 2021

(65) Prior Publication Data
US 2023/0001409 A1 Jan. 5, 2023

Related U.S. Application Data

(60) Provisional application No. 62/936,883, filed on Nov. 18, 2019.

(51) Int. Cl.
*B01L 3/00* (2006.01)
*G01K 3/04* (2006.01)
*G01K 13/08* (2006.01)

(52) U.S. Cl.
CPC ............ *B01L 3/50851* (2013.01); *G01K 3/04* (2013.01); *G01K 13/08* (2013.01);
(Continued)

(58) Field of Classification Search
CPC ......... B01L 3/50851; B01L 2300/0654; B01L 2300/0803; B01L 2300/18; G01K 3/04;
(Continued)

(56) References Cited

U.S. PATENT DOCUMENTS 4,742,862 A 5/1988 Weber
10,082,505 B2 9/2018 Melanson et al.
(Continued)

FOREIGN PATENT DOCUMENTS

CN 109443598 A * 3/2019
JP 62-192228 8/1987
(Continued)

OTHER PUBLICATIONS

International Search Report and Written Opinion in connection with International Application No. PCT/US2020/061082 dated Mar. 7, 2021.
(Continued)

*Primary Examiner* — John McGuirk
(74) *Attorney, Agent, or Firm* — Meunier Carlin & Curfman LLC

(57) ABSTRACT

Verification plates for a bacterial endotoxin reader are provided, namely a temperature verification plate (TVP) and optical verification plate (OVP). The TVP has a body configured to be placed on a spindle of said reader and rotated by said spindle. The body has a temperature verification circuit with a temperature sensor and a temperature indicator. The temperature sensor is configured to measure a temperature of the body rotated by the spindle of the reader. The temperature indicator optically represents a value of the
(Continued)

temperature measured by the temperature sensor. The temperature indicator is readable by an optical bench of the reader. The OVP has a body with a plurality of apertures located along a periphery that line up with an optical bench of the reader. Light produced by a light source of the reader can pass through the aperture and an intensity measured by a photodetector of the reader.

8 Claims, 18 Drawing Sheets

(52) U.S. Cl.
CPC ............... *B01L 2300/0654* (2013.01); *B01L 2300/0803* (2013.01); *B01L 2300/18* (2013.01)

(58) Field of Classification Search
CPC ......... G01K 13/08; G01N 2035/00356; G01N 35/00069; G01N 35/00693
See application file for complete search history.

(56) References Cited

U.S. PATENT DOCUMENTS

| | | |
|---|---|---|
| 2012/0003659 A1 | 1/2012 | Yoo |
| 2015/0040997 A1* | 2/2015 | Blake .................. E03C 1/057 |
| | | 137/551 |

FOREIGN PATENT DOCUMENTS

| | | |
|---|---|---|
| KR | 20160096770 | 8/2016 |
| WO | WO-2016126141 A1 * | 8/2016 ............ B01L 3/00 |

OTHER PUBLICATIONS

Communication Pursuant to Article 94(3) EOC, dated Jul. 10, 2024.
Office Action issued for Canadian Application No. 3158725, dated Mar. 1, 2024.
Office Action issued for Japanese Application No. 2022-529114, dated Jul. 30, 2024.
Office Action issued for Chinese Application No. 2020800907262, dated Dec. 27, 2024. 11 pages.

* cited by examiner

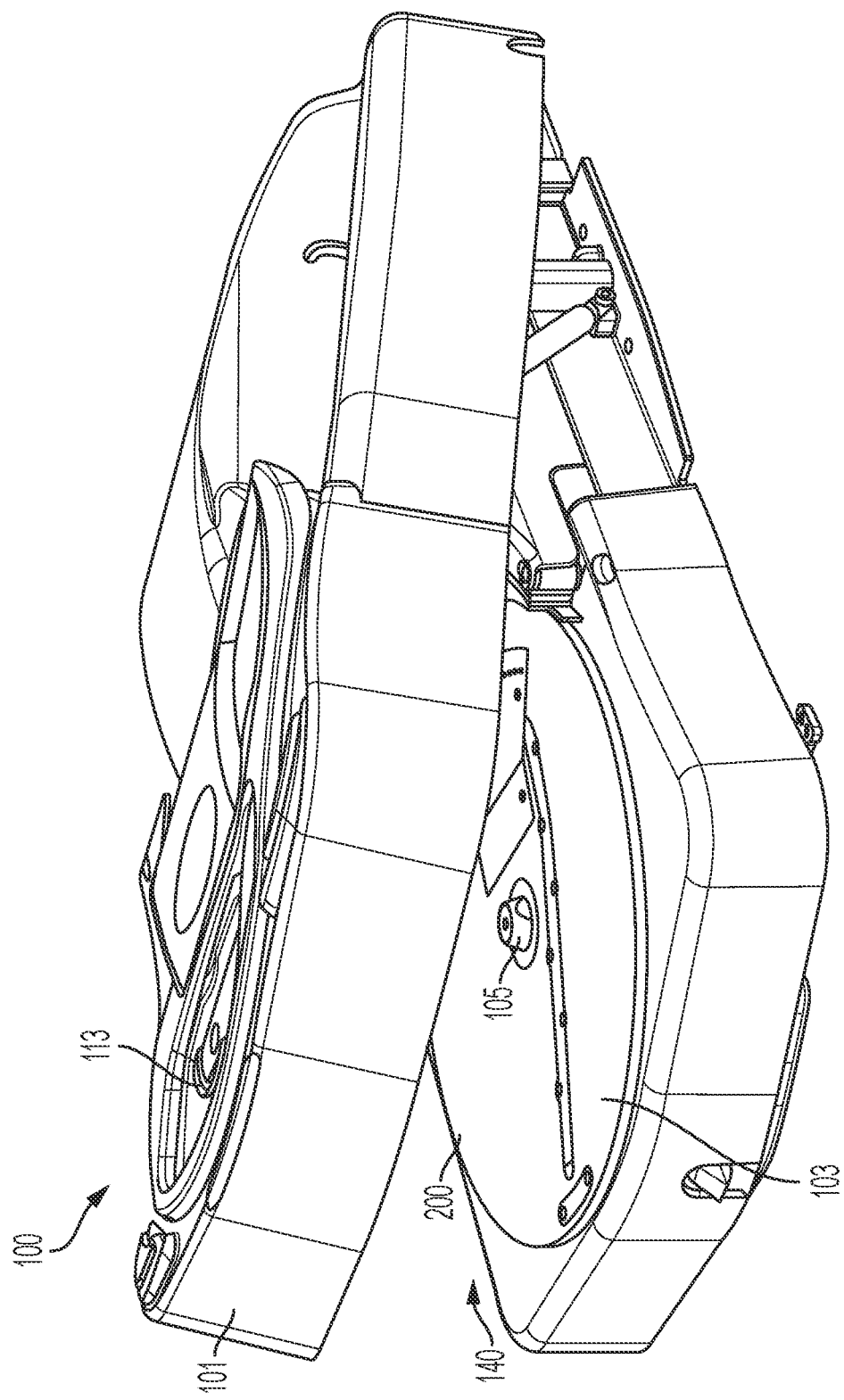

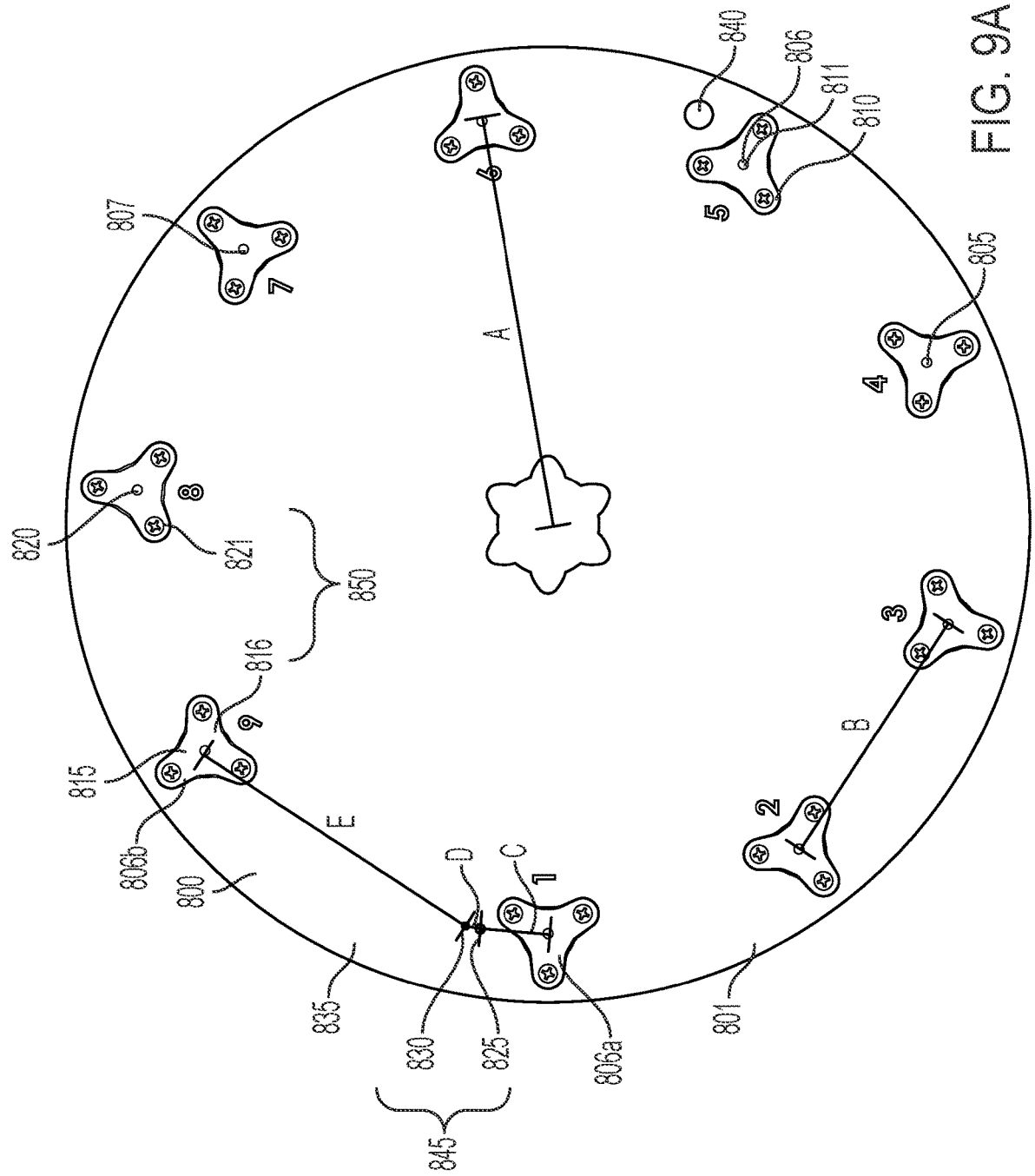

BACTERIAL ENDOTOXIN READER VERIFICATION PLATES AND METHODS OF USE

CROSS REFERENCE TO RELATED APPLICATIONS

This application is a United States National Phase Patent Application of International Patent Application Number PCT/US2020/061082, filed on Nov. 18, 2020, which claims the benefit of priority to U.S. Provisional Application No. 62/936,883, filed Nov. 18, 2019, which is incorporated by reference herein in its entirety.

FIELD OF THE INVENTION

This application is directed to bacterial endotoxin reader verification. More specifically, to temperature and/or optical verification of a bacterial endotoxin reader.

BACKGROUND OF THE INVENTION

Bacterial endotoxin readers require periodic verification of their optical reading and temperature measurement performance.

BRIEF SUMMARY OF THE INVENTION

In one aspect of the invention, a temperature verification plate (TVP) for a bacterial endotoxin reader has a body configured to be placed on a spindle of the reader and rotated by the spindle; the body having a temperature verification circuit comprising a temperature sensor and a temperature indicator; the temperature sensor being configured to measure a temperature of the body, when rotated by the spindle of the reader; the temperature indicator being configured to optically represent a value of the temperature measured by the temperature sensor, wherein the temperature indicator is readable by an optical bench of the reader.

In another aspect of the invention, the temperature sensor may be an electronic temperature sensor, a thermistor, a thermocouple and/or a resistance temperature detector. The temperature indicator is at least one light emitting diode (LED) and/or at least one liquid crystal display (LCD). The temperature indicator represents the value of the temperature as a binary number.

In another aspect of the invention, the binary number determines a resolution of the temperature measured by the temperature sensor, wherein the binary number has two or more verification bits. The binary number can be a 12 digit number.

In another aspect of the invention, the temperature indicator can have a variety of LED or LCD configurations, such as a single LED, 12 LEDs, 14 LEDs, a single LCD, 12 LCDs, or 14 LCDs.

In another aspect of the invention, the temperature verification circuit further includes a battery and a switch. The battery provides power to the temperature verification circuit. The switch permits current to flow from the battery, when the switch is in an "ON" position, and prevents the flow of current from the battery, when the switch is in an "OFF" position.

In another aspect of the invention, the temperature sensor obtains the temperature measurements at a first recurring interval during a first predetermined length of time. The temperature indicator outputs an average of the temperature measurements.

The first predetermined length of time may be about 5 seconds and the first recurring interval may be about 0.1 seconds.

In yet another aspect of the invention, a method of verifying a temperature performance of a bacterial endotoxin reader includes: providing a reader and a temperature verification plate (TVP); placing the TVP on a spindle of the reader, spinning up the TVP using the spindle, and activating a heater of the reader to maintain a temperature of a body of the TVP at a predetermined temperature; obtaining a temperature measurement value of the body of the TVP from a temperature indicator of the TVP using an optical bench of the reader; obtaining a temperature measurement value of the body of the TVP using a temperature measurement sensor of the reader; calculating and comparing a difference between the temperature measurement value obtained from the temperature indicator of the TVP with the temperature measurement value obtained from the temperature measurement sensor of the reader; and indicating a reader temperature measurement sensor calibration error, when the difference is greater than a predetermined temperature difference threshold.

In another aspect of the invention, the method further includes calculating and applying a calibration factor to the temperature measurement value obtained from the temperature measurement sensor of the reader, based on the difference between the temperature measurement value obtained from the TVP and the temperature measurement value obtained from the reader temperature sensor. The predetermined temperature difference threshold may be about 1° C., about 0.5° C., or about 0.1° C. The difference may be calculated at two or more predetermined temperatures. The predetermined temperatures may be 22° C. and/or 37° C.

In another aspect of the invention, the method further includes calculating and applying a calibration factor to the temperature measurement value obtained from the temperature measurement sensor of the reader, based on the difference between the temperature measurement value obtained from the TVP at two or more predetermined temperatures and the temperature measurement value obtained from the reader temperature sensors at the two or more predetermined temperatures. The calibration factor may be determined using straight-line interpolation and/or mathematical regression.

In yet another aspect of the invention, an optical verification plate (OVP) for a bacterial endotoxin reader may include a body with a plurality of apertures located along a periphery of the body; a center of each aperture is located a first predetermined radial distance away from a center of the body, thereby permitting the apertures to line up with an optical bench of the reader, such that a light produced by a light source of the reader can pass through the aperture and an intensity of the light can be measured by a photodetector of the reader; the apertures are comprised of filtered apertures and unfiltered apertures; the filtered apertures are spaced apart by a second predetermined distance when travelling counter-clockwise around the OVP.

In another aspect of the invention, the filtered apertures may be comprised of one or more neutral density filter aperture and one or more wavelength filtered aperture. The one or more wavelength filtered aperture may be comprised of one or more short pass filtered aperture, one or more long pass filtered aperture, one or more bandpass filtered aperture, and/or one or more stopband filtered aperture. The filtered apertures may be comprised of at least one wavelength filtered aperture and second neutral density filtered apertures. The at least one wavelength filtered aperture may be comprised of one long pass filtered aperture and one short pass filtered aperture. The one or more filters may be mounted on the OVP to form a first predetermined angle with respect to a top surface of the body of the OVP, and/or wherein one or more filters may be mounted on the OVP to form a first predetermined angle with respect to a filter bed of the body of the OVP. The first predetermined angle may be about zero degrees, about 30 degrees, or between about zero degrees and about 45 degrees.

In another aspect, the OVP may include an incident aperture and/or a registration aperture. The incident aperture may be located between a first filtered aperture and the registration aperture. The registration aperture may be located between the incident aperture and a last filtered aperture.

In yet another aspect of the invention, a method of verifying the optical performance of an optical bench of a bacterial endotoxin reader includes providing a reader and an optical verification plate (OVP); placing the OVP on a spindle of the reader and spinning up the OVP; identifying a registration pattern on the OVP using the optical bench of the reader; measuring an intensity of light passing through an incident aperture of the OVP using a photodetector of the reader, wherein the light is generated by the light source of the reader and the value of the measurement is stored as incident light ($I_i$) in a memory of the reader; measuring an intensity of light passing through at least one neutral density filtered aperture using a photodetector of the reader, wherein the light is generated by the light source of the reader and the value of the measurement is stored in the memory of the reader as an intensity neutral measurement ($I_{fN}$), with N being incremented once for each of the neutral density filtered aperture, and repeating for each of the neutral density filtered aperture; calculating a transmission ($T_N$) for each of the neutral density filtered aperture and storing in the memory of the reader, using the formula $T_N=(I_{fN}/I_i)$; calculating a measured absorbance ($A_{mN}$) for each of the neutral density filtered aperture and storing in the memory of the reader, using the formula $A_{mN}=-\log_{10}(T_N)$, and storing in memory; comparing the $A_{mN}$ for each of the neutral density filtered aperture with a predetermined absorbance value ($A_{pN}$) by calculating a percent error and storing the absorbance percent error calculated for each of the neutral density filtered aperture in memory, using the formula $AError_N=(A_{mN}-A_{pN})/A_{pN}$; comparing $AError_N$ to a predetermined neutral density absorbance error threshold and indicating that the optical bench is out of specification if the $AError_N$ is greater than the predetermined neutral density absorbance error threshold; measuring an intensity of light passing through at least one wavelength filtered aperture using the photodetector of the reader, wherein the light is generated by the light source of the reader and the value of the measurement is stored in memory as intensity wavelength measurement ($I_{WN}$), with N being incremented once for each wavelength filtered aperture, and repeating for each of the wavelength filtered aperture; calculating a wavelength error of the optical bench ($WError_N$) by evaluating a ratio of the $I_{WN}$ for each of the wavelength filtered aperture and the $I_i$, using the formula $WError_N=I_{WN}/I_i$, and storing in memory; and comparing the $WError_N$ for each of the wavelength filtered aperture to a predetermined wavelength error threshold and indicating that the optical bench is out of specification if the $WError_N$ is greater than the predetermined error wavelength threshold.

In anther aspect of the invention, the filtered apertures may include one or more neutral density filter aperture and one or more wavelength filtered aperture. The one or more wavelength filtered aperture may include one or more short pass filtered aperture, one or more long pass filtered aperture, one or more bandpass filtered aperture, and/or one or more stopband filtered aperture. The filtered apertures are may include of at least one wavelength filtered aperture and second neutral density filtered apertures. The at least one wavelength filtered aperture may include at least one long pass filtered aperture and one short pass filtered aperture.

In another aspect of the invention, one or more filters may be mounted on the OVP to form a first predetermined angle with respect to a top surface of the body of the OVP, and/or wherein one or more filters may be mounted on the OVP to form a first predetermined angle with respect to a filter bed of the body of the OVP. The first predetermined angle may be about zero degrees, about 30 degrees, or between about zero degrees and about 45 degrees.

In yet another aspect of the invention, a bacterial endotoxin reader includes a control unit and memory storing executable code when executed by the control unit performs actions including: spinning up, using a spindle of the reader, an optical verification plate (OVP) placed on the spindle of the reader; identifying a registration pattern on the OVP using an optical bench of the reader; measuring an intensity of light passing measuring an intensity of light passing through an incident aperture of the OVP using a photodetector of the reader, wherein the light is generated by the light source of the reader and the value of the measurement is stored as incident light (Ii) in the memory of the reader; measuring an intensity of light passing through at least one neutral density filtered aperture using a photodetector of the reader, wherein the light is generated by the light source of the reader and the value of the measurement is stored in the memory of the reader as an intensity neutral measurement ($I_{fN}$), with N being incremented once for each of the neutral density filtered aperture, and repeating for each of the neutral density filtered aperture; calculating a transmission ($T_N$) for each of the neutral density filtered aperture and storing in the memory of the reader, using the formula $T_N=(I_{fN}/I_i)$; calculating a measured absorbance ($A_{mN}$) for each of the neutral density filtered aperture and storing in the memory of the reader, using the formula $A_{mN}=-\log_{10}(T_N)$, and storing in memory; comparing the $A_{mN}$ for each of the neutral density filtered aperture with a predetermined absorbance value ($A_{pN}$) by calculating a percent error and storing the absorbance percent error calculated for each of the neutral density filtered aperture in memory, using the formula $AError_N=(A_{mN}-A_{pN})/A_{pN}$; comparing $AError_N$ to a predetermined neutral density absorbance error threshold and indicating that the optical bench is out of specification if the $AError_N$ is greater than the predetermined neutral density absorbance error threshold; measuring an intensity of light passing through at least one wavelength filtered aperture using the photodetector of the reader, wherein the light is generated by the light source of the reader and the value of the measurement is stored in memory as intensity wavelength measurement ($I_{WN}$), with N being incremented once for each wavelength filtered aperture, and repeating for each of the wavelength filtered aperture; calculating a wavelength error of the optical bench ($WError_N$) by evaluating a ratio of the $I_{WN}$ for each of the wavelength filtered aperture and the $I_i$, using the formula $WError_N=I_{WN}/I_i$, and storing in memory; and comparing the $WError_N$ for each of the wavelength filtered aperture to a predetermined wavelength error threshold and indicating that the optical bench is out of specification if the $WError_N$ is greater than the predetermined error wavelength threshold.

In yet another aspect of the invention, a bacterial endotoxin reader includes: a control unit and memory storing executable code when executed by the control unit performs actions comprising: spinning up, using a spindle of the reader, a temperature verification plate (TVP) placed on the spindle of the reader; activating a heater of the reader to maintain a temperature of a body of the TVP at a predetermined temperature; obtaining and storing in memory a temperature measurement value of the body of the TVP from a temperature indicator of the TVP using an optical bench of the reader; obtaining and storing in the memory a temperature measurement value of the body of the TVP using a temperature measurement sensor of the reader; calculating, storing in the memory, and comparing a difference between the temperature measurement value obtained from the temperature indicator of the TVP with the temperature measurement value obtained from the temperature measurement sensor of the reader; and indicating a reader temperature measurement sensor calibration error, when the difference is greater than a predetermined temperature difference threshold.

In another aspect of the invention, the code when executed by the control unit performs additional actions comprising: applying a calibration factor to the temperature measurement value obtained from the temperature measurement sensor of the reader, based on the difference between the temperature measurement value obtain from the TVP and the temperature measurement value obtained from the reader temperature sensor.

In another aspect of the invention, the code when executed by the control unit performs additional actions comprising: calculating and applying a calibration factor to the temperature measurement value obtained from the temperature measurement sensor of the reader, based on the difference between the temperature measurement value obtained from the TVP at two or more predetermined temperatures and the temperature measurement value obtained from the reader temperature sensors at the two or more predetermined temperatures.

In another aspect of the invention, the code when executed by the control unit performs additional actions comprising: determining the calibration factor using straight-line interpolation and/or mathematical regression.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 1A is an isometric view of an illustrative reader and verification plate in accordance with an exemplary embodiment of the disclosed technology;

FIG. 9A is a top view of an illustrative optical verification plate in accordance with an exemplary embodiment of the disclosed technology;

Figure 1B:
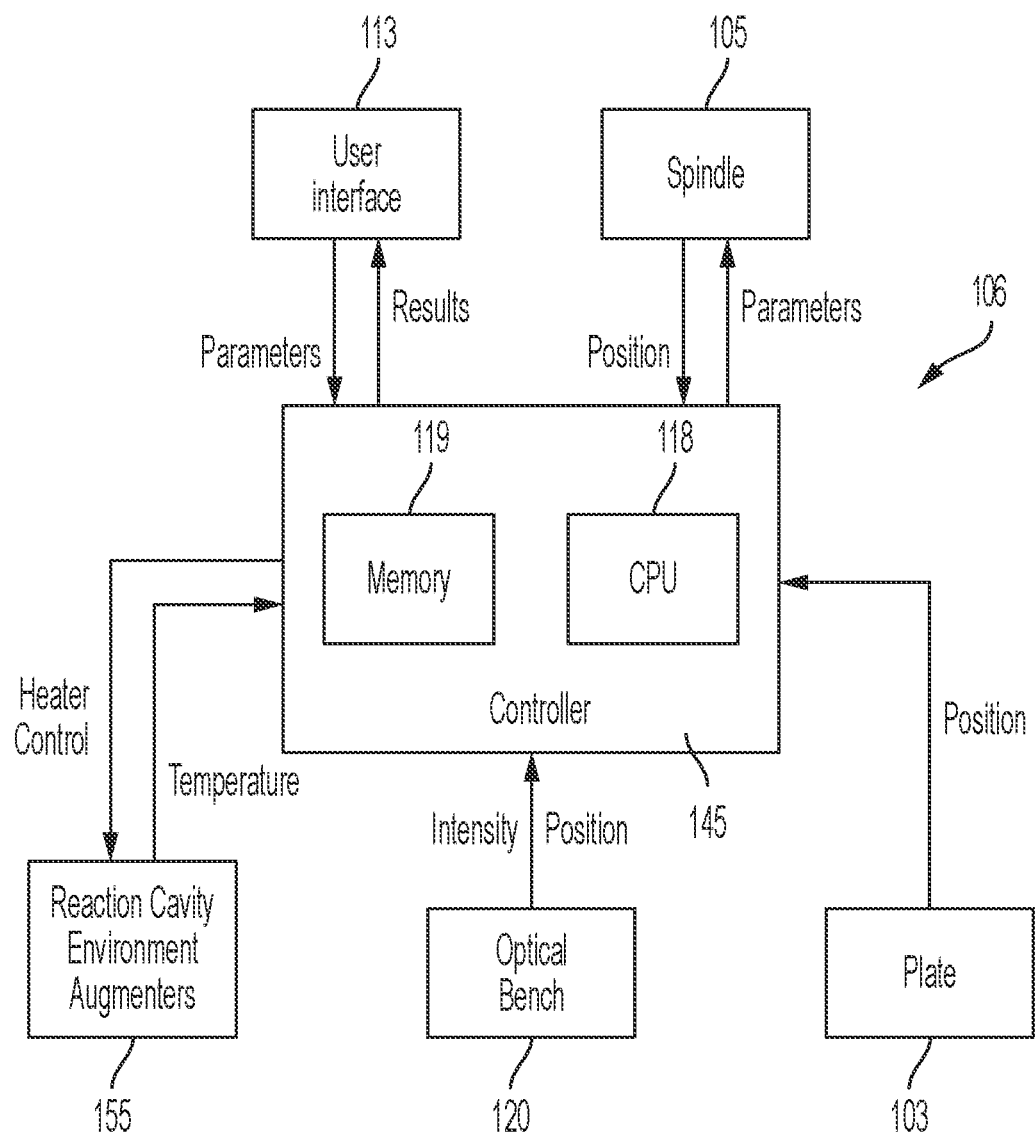
FIG. 1B is a block diagram of an illustrative reader in accordance with an exemplary embodiment of the disclosed technology.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified.

In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can also include a drive (disk). The memory can store an operating system that controls or allocates resources of a computing device. The memory can also store data for use by the processor.

A "controller", as used herein, can a include a variety of configurations, for example a processor and memory. Controller, can also include a microcontroller having on-board processor and memory.

A "drive", as used herein can be, for example, a magnetic drive, a solid state drive, a floppy drive, a tape drive, a Zip drive, a flash memory card, and/or a memory stick. Furthermore, the drive can be a CD-ROM (compact disk ROM), a CD recordable drive (CD-R drive), a CD rewritable drive (CD-RW drive), and/or a digital video ROM drive (DVD ROM). The drive can store an operating system and/or program that controls or allocates resources of a computing device.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of drive including floppy drives (disks), optical drives (disks), CD-ROMs, magnetic-optical drives (disks), read-only memories (ROMs), random access memories (RAMs), EPROMs, EEPROMs, magnetic or optical cards, application specific integrated circuits (ASICs), or any type of media suitable for storing electronic instructions, and each electrically connected to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

Turning to FIGS. 1-7, bacterial endotoxin reaction results may be negatively affected if the temperature measurement at the reaction well of a reaction disc within the bacterial endotoxin reader 100 is not within specification. Further, the results may be negatively affected if the light source 130 and/or photodetector 135 of the reader 100 are not operating within specification. The light source and sensor measure the optical response of the plate (disc) 103, which may be a reaction plate, or a verification plate 200.

A verification of the temperature and/or optical performance of the reader 100 be performed using a verification plate 200 that is removably mountable to the spindle 105 of the reader 100, such as a temperature verification plate (TVP) 300 and/or an optical verification plate (OVP) 800.

The TVP 300 may wirelessly report the temperature of a specific location on the body 335 of the TVP to the reader 100. The TVP 300 may be used to verify that the heaters 110 and temperature sensors 115 of the reader 100 are operating correctly. In an embodiment, temperature sensor 115 may be one or more infrared temperature sensors. In an embodiment, the heater 110 of reader 100 may be comprised of an upper heater 110a and a lower heater 110b, and the temperature sensor 115 of reader 100 may be comprised of an upper temperature sensor 115a and lower temperature sensor 115b for maintaining the temperature of the reaction cavity 140 of reader 100 at a predetermined temperature, such as measuring the temperature of a predetermined location on the TVP 300 and maintaining the temperature of the predetermined location on the TVP at the predetermined temperature. The upper heater 110a heats the top surface 336 of the TVP 300 at the predetermined location on the TVP 300 and the lower heater 110b heats the bottom surface 337 of the TVP 300 at the predetermined location to maintain the predetermined temperature. In an embodiment, the predetermined temperature may be about 37° C. In some embodiments, the predetermined temperature is maintained at a first predetermined radial distance away from the center of the spindle 105 on TVP 300, while TVP 300 is spinning in reader 100 during use. This first predetermined radial distance may also be the radial distance away from the center of the spindle 105 where the temperature sensors 115 of the reader 100 measure the temperature of the TVP 300. This first predetermined radial distance is represented by "A" on FIG. 3. The distance between the spindle 105 and a center of an aperture 125 of an optical bench 120 of reader 100 is also equal to the first predetermined radial distance "A". This first predetermined radial distance may also be equal to the distance between the spindle 105 and the location of the reaction wells on a reaction plate 103. In one exemplary embodiment, the first predetermined radial distance "A" is about 98 mm. In an exemplary embodiment, the aperture 125 may be a window that permits light to pass, but prevents ingress of dust and/or fluids from entering the optical bench 120.

Stated alternatively, since the goal of the TVP 300 and OVP 800 are to verify the operation of the temperature control and optical measurement capabilities of the reader 100 at the location of the reaction wells on a reaction plate, radial distance "A" in an embodiment of reader 100 may be equivalent to the radial distance between the center of spindle 105 and the location of the reaction wells reaction plate 103 when placed in reader 100, the radial distance between the center of spindle 105 and the location where the predetermined temperature is measured and maintained on the TVP 300 using temperature sensor 115 and heater 110, the radial distance between the center of spindle 105 and the location of the TVP temperature sensor 315, the radial distance between the center of spindle 105 and the location of the TVP temperature indicator 320, the radial distance between the center of spindle 105 and the location of temperature sensor 115, the radial distance between the center of spindle 105 and the location of and heater 110, the radial distance between the center of the TVP 300 and the location where the predetermined temperature is measured and maintained on the TVP 300 using temperature sensor 115 and heater 110, the radial distance between the center of the TVP 300 and the location of the TVP temperature sensor 315, the radial distance between the center of the TVP 300 and the location of the TVP temperature indicator 320, the radial distance between the center of spindle 105 and the location on the OVP 800 where the optical bench 120 of the reader 100 outputs light onto and measures light passing though OVP 800 using the light source 130 and photodetector 135, the radial distance between the center of spindle 105 and apertures 805 of OVP 800, the radial distance between the center of the OVP 800 and the location on the OVP 800 where the optical bench 120 of the reader 100 outputs light onto and measures light passing though OVP 800 using the light source 130 and photodetector 135, the radial distance between the center of the OVP 800 and apertures 805 of OVP 800, and/or the radial distance between the center of spindle 105 and/or the location of the light source 130 and photodetector 135 of optical bench 120.

The TVP 300 has a temperature verification circuit 301, which may have a TVP controller 305, a battery 310, a temperature sensor 315, and a temperature indicator 320. The TVP 300 may also have a switch 325, a counter weight 330 for balancing the TVP 300, a body 335, and a temperature sensor channel 316 in body 335 containing the temperature sensor 315. The body 335 may be constructed of a material having the same emissivity as the reaction disc, such that a temperature sensor 115 of the reader 100 measures the temperature of the reaction disc and TVP 300 with the same accuracy. The body 335 may be constructed from the same material as the body of the reaction disc. The body 335 may be constructed of, but not limited to, one or more of polystyrene, cyclic olefin copolymer, and/or glycol-modified polyethylene terephtalate. In some embodiments body 335, carbon may be added to make the polystyrene black to aid in optical absorbance methods. Further, one or more components of the temperature verification circuit 301 may be located below a top surface 336 of the body 335 and may have a cover, such as the battery 310, temperature indicator 320, and temperature sensor 315. The body 335 may also have a bottom surface 337, that is located opposite of the top surface 336 on the body 335.

Figure 2A:
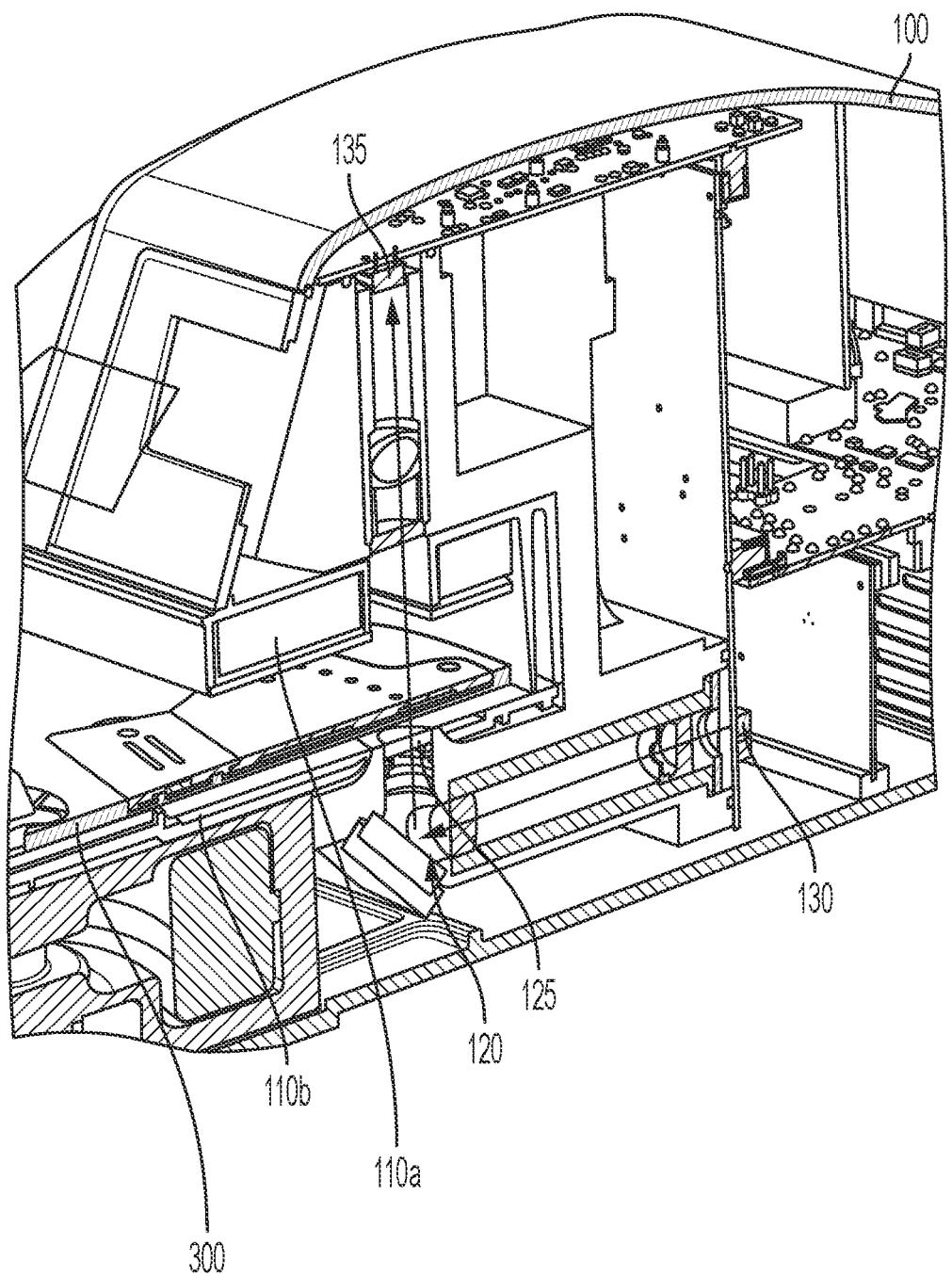
FIG. 2A is a cross-section of an illustrative reader in accordance with an exemplary embodiment of the disclosed technology.
Figure 2B:
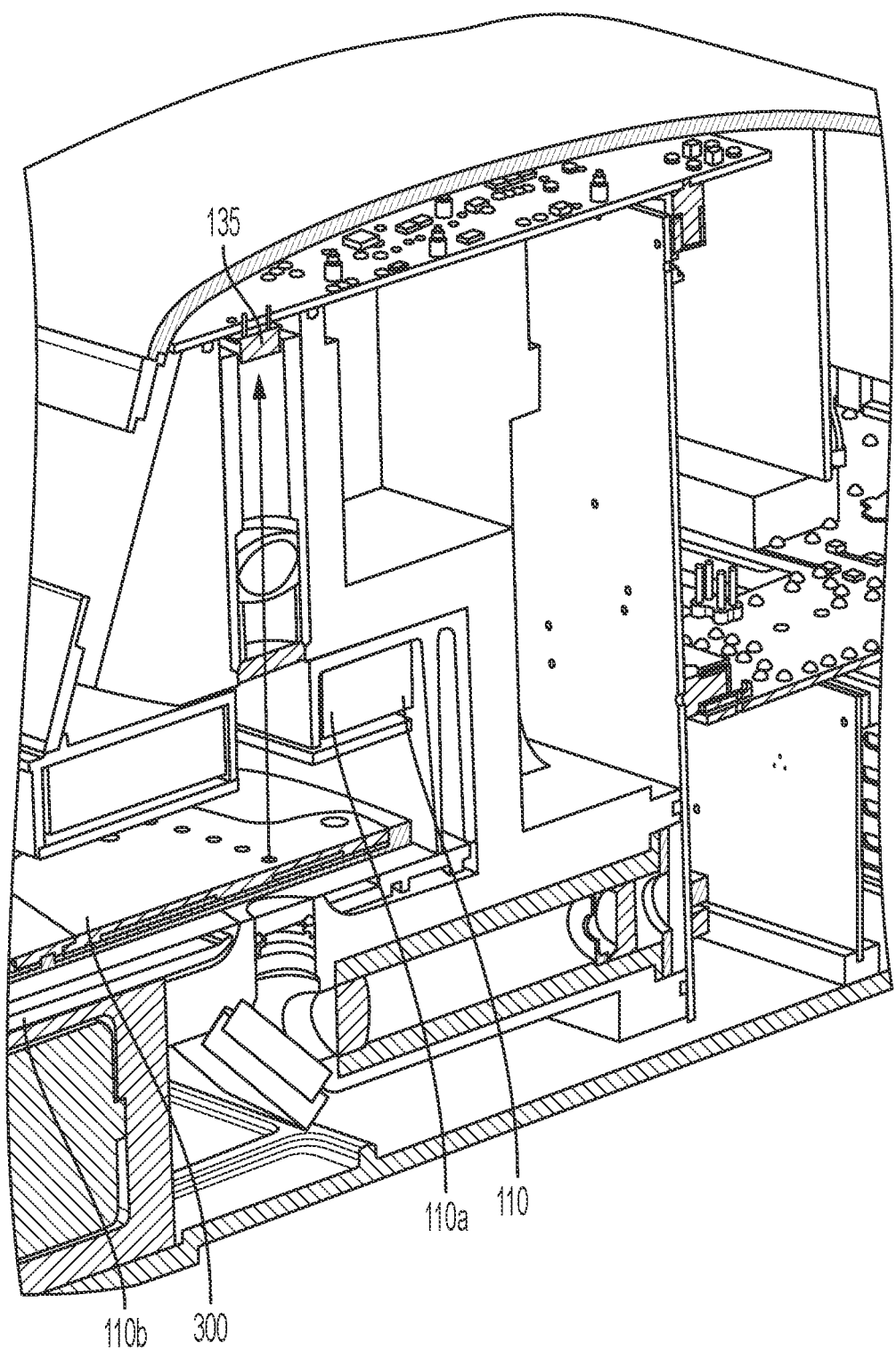
FIG. 2B is a cross-section of an illustrative reader in accordance with an exemplary embodiment of the disclosed technology.
Figure 2C:
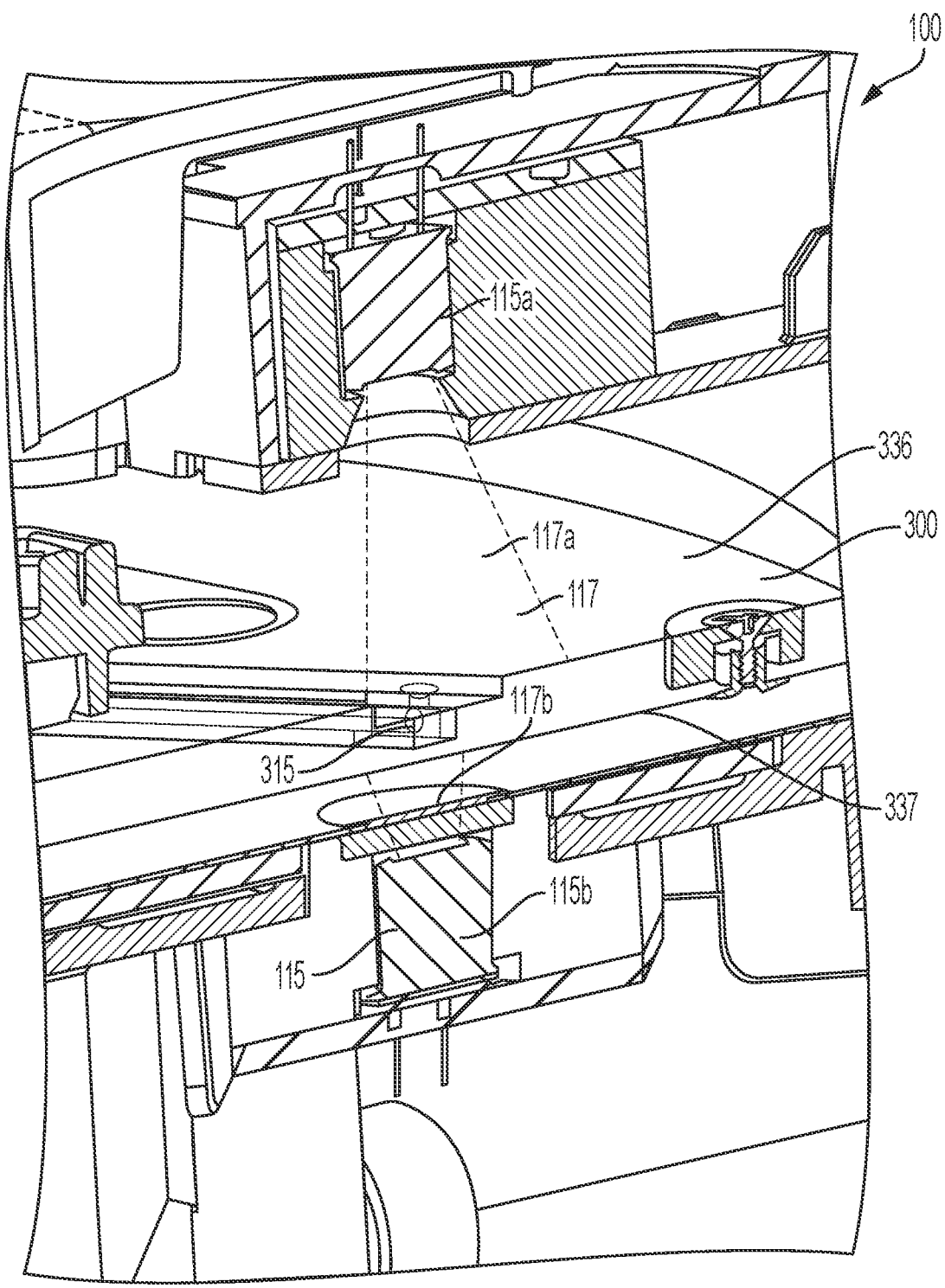
FIG. 2C is a cross-section of an illustrative reader in accordance with an exemplary embodiment of the disclosed technology.
Figure 3:
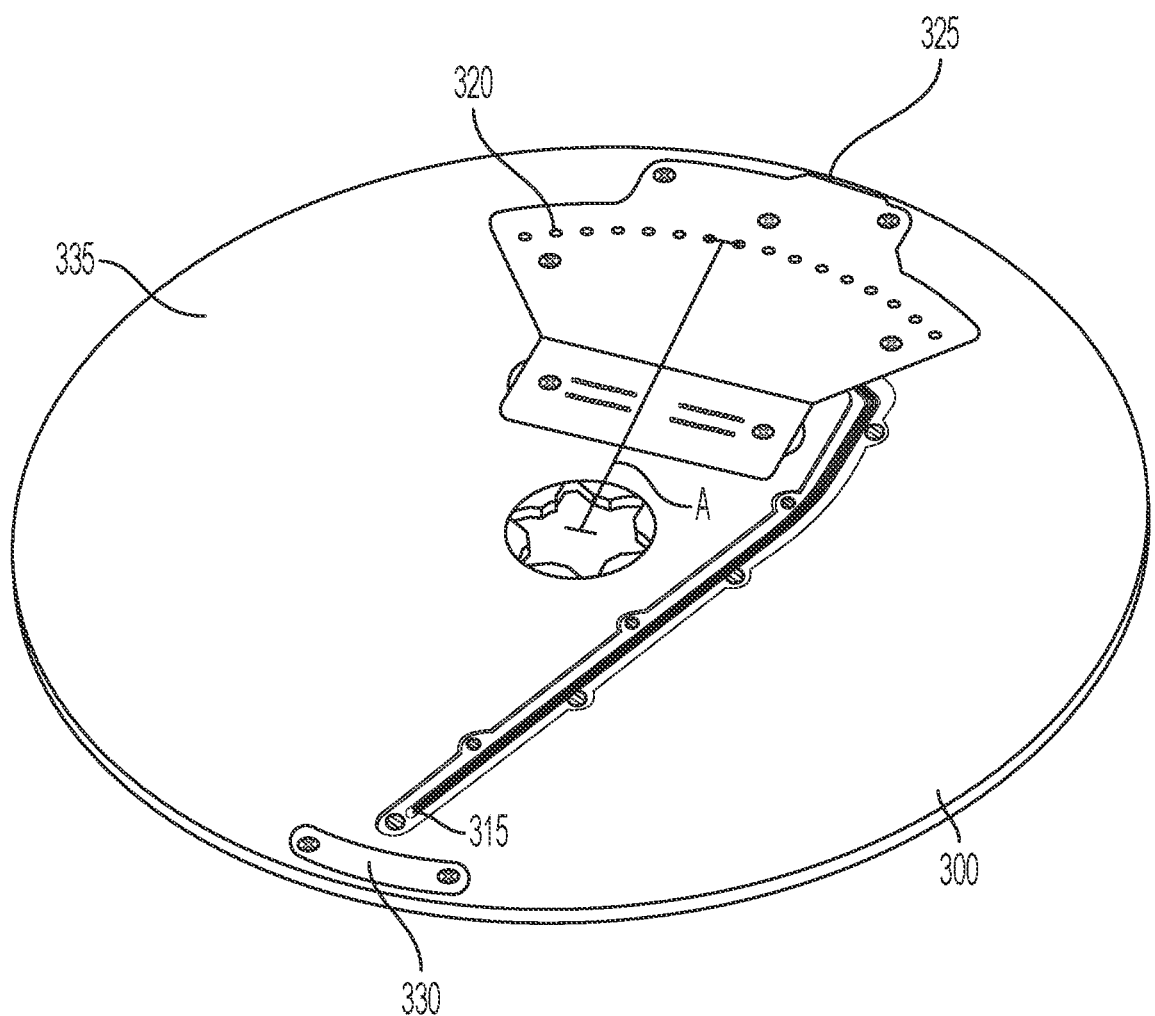
FIG. 3 is an isometric view of an illustrative temperature verification plate in accordance with an exemplary embodiment of the disclosed technology.
Figure 4:
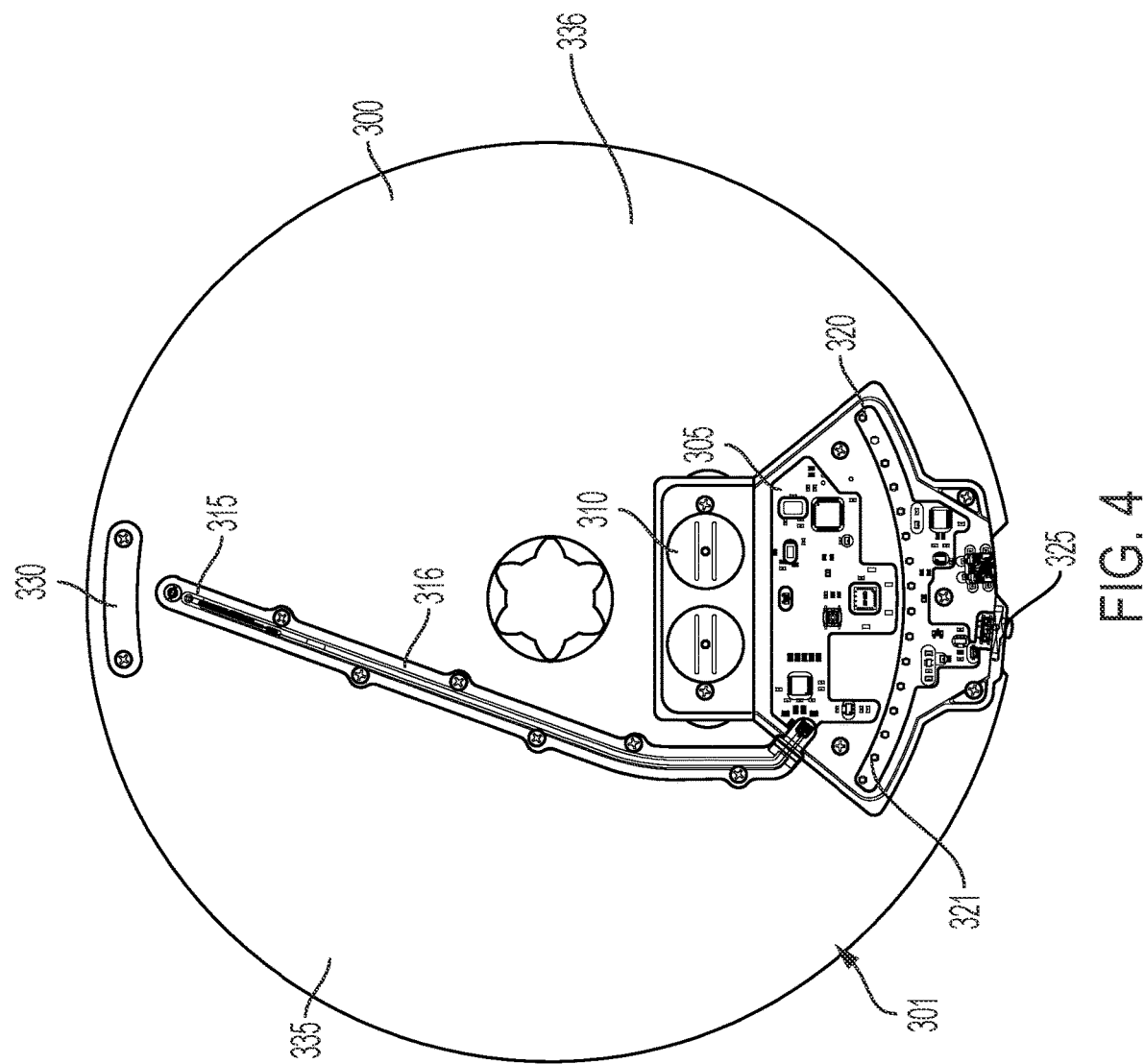
FIG. 4 is a top view of an illustrative temperature verification plate in accordance with an exemplary embodiment of the disclosed technology.
Figure 5:
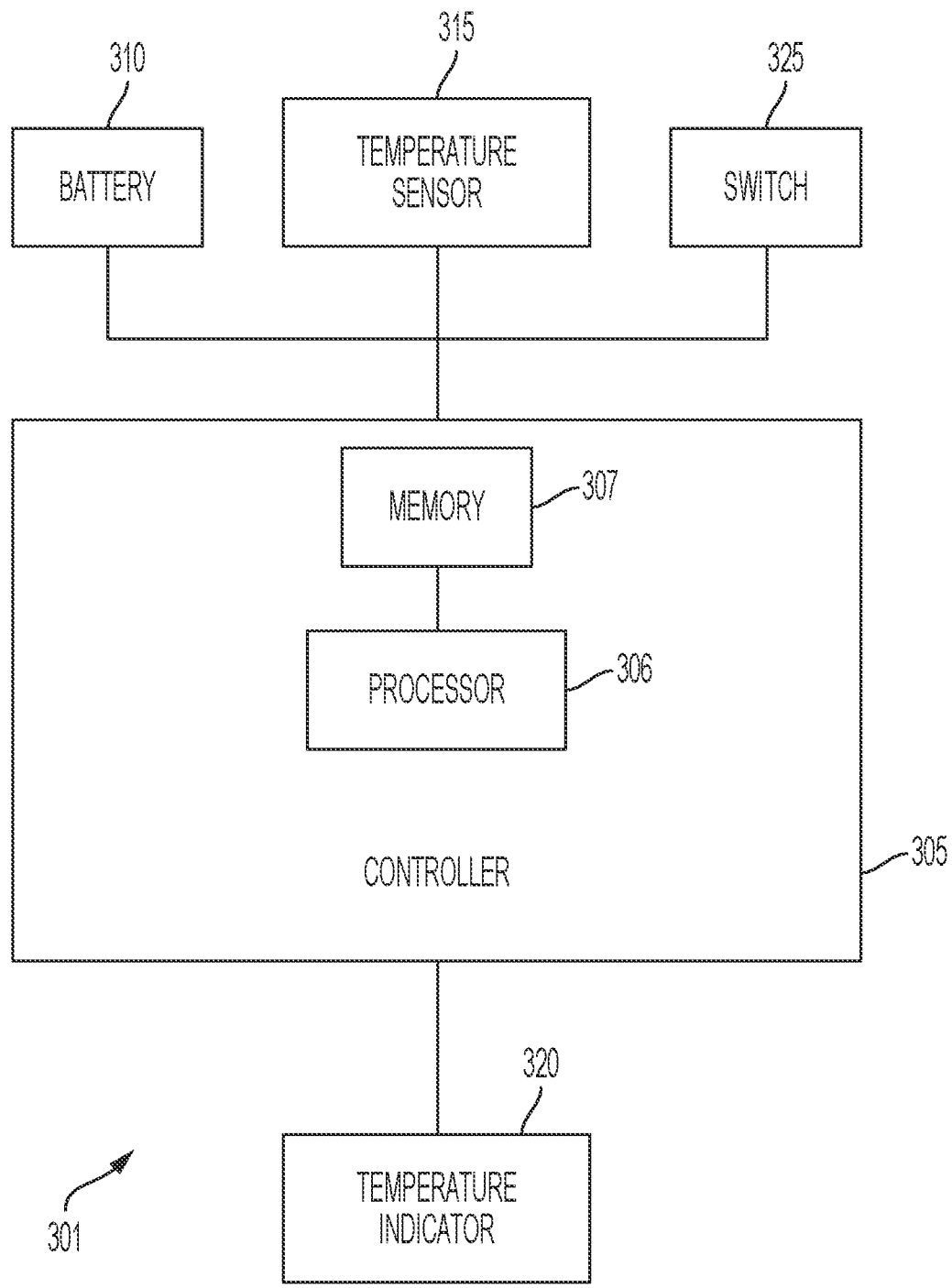
FIG. 5 is a block diagram of an illustrative temperature verification plate in accordance with an exemplary embodiment of the disclosed technology.
Figure 6:
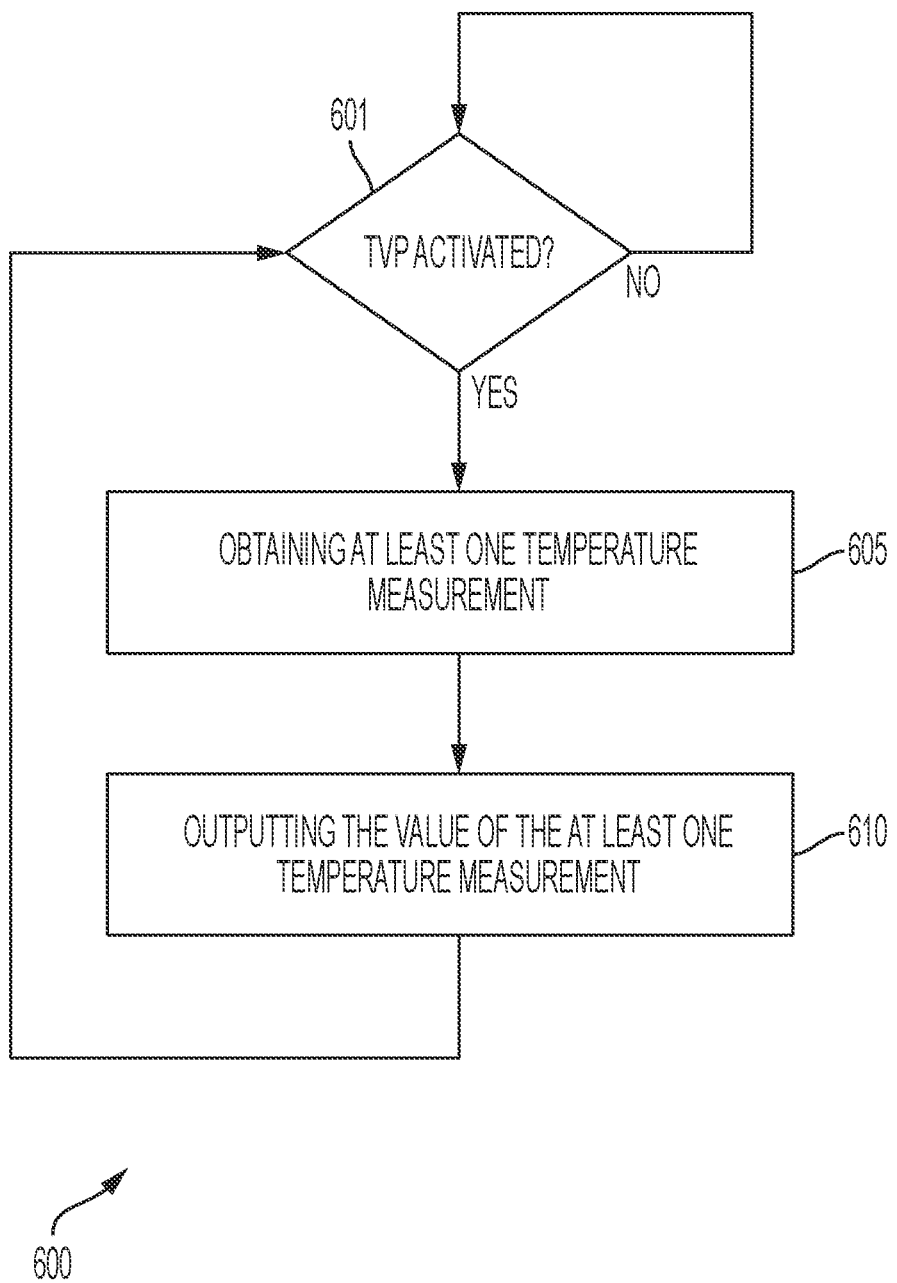
FIG. 6 is a flow diagram of an example method of using a temperature verification plate in accordance with an exemplary embodiment of the disclosed technology.
Figure 7:
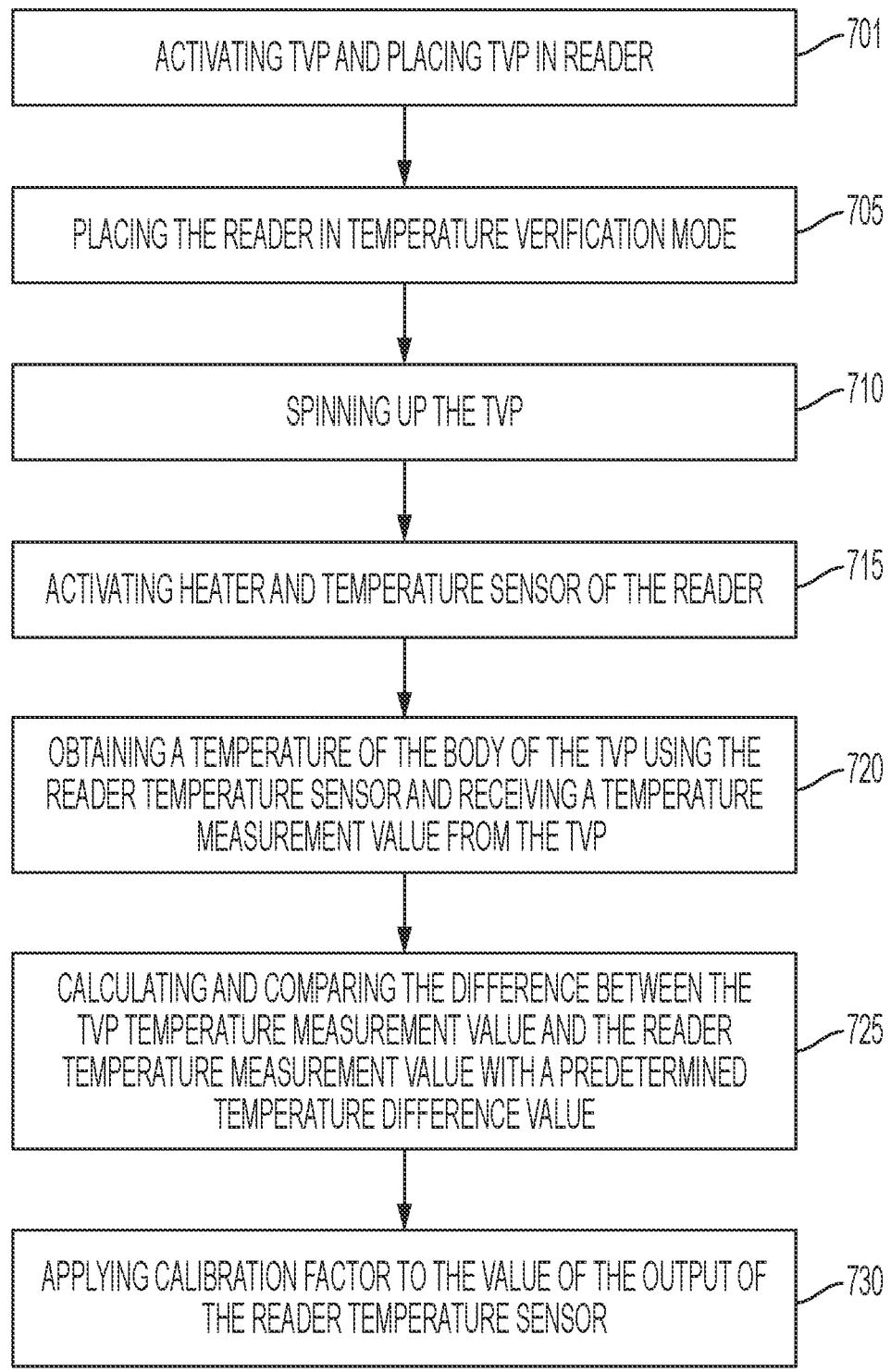
FIG. 7 is a flow diagram of an example method of verifying reader temperature measurements using a temperature verification plate in accordance with an exemplary embodiment of the disclosed technology.
Figure 8A:
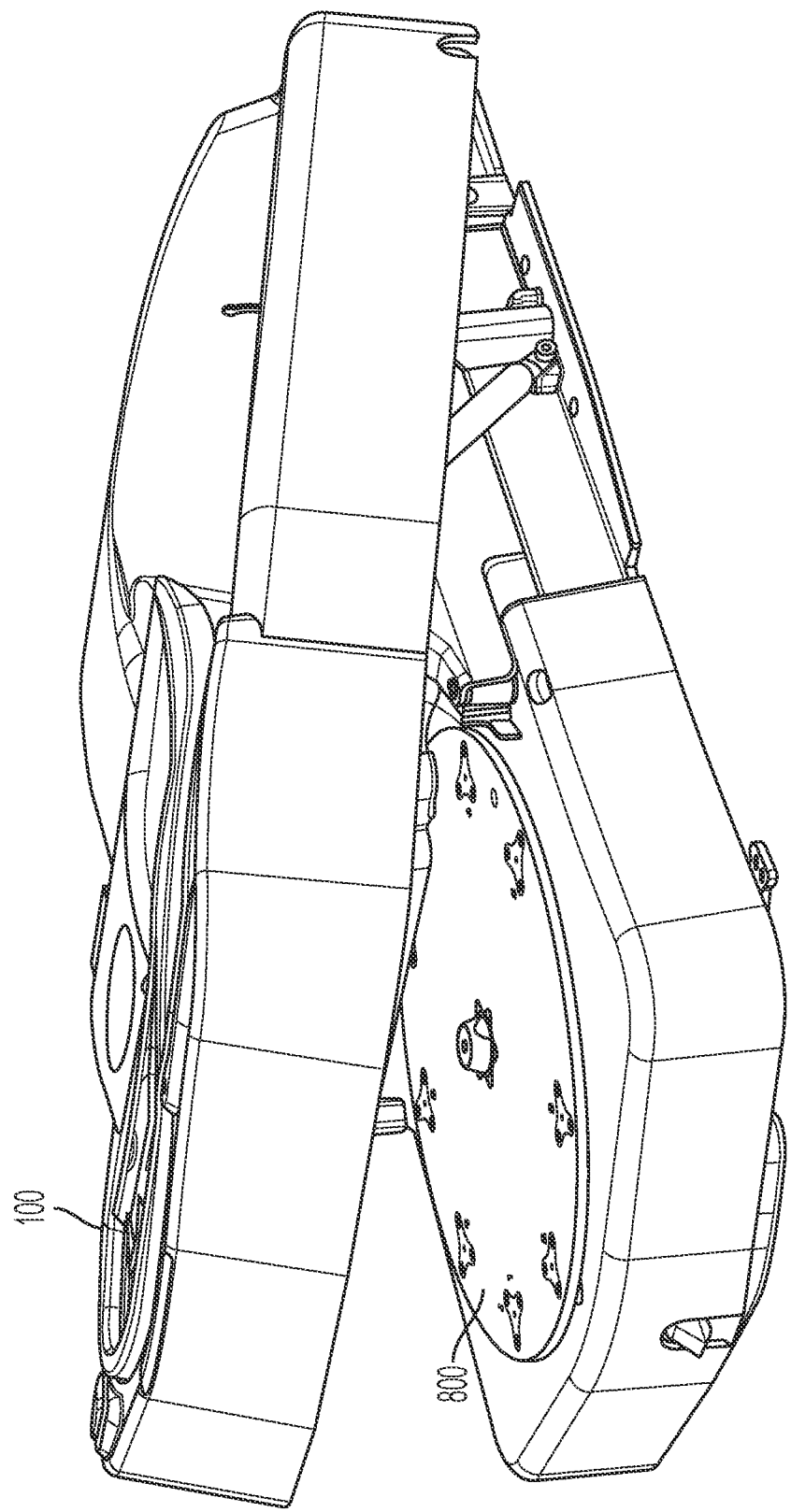
FIG. 8A is an isometric view of an illustrative reader and optical verification plate in accordance with an exemplary embodiment of the disclosed technology.
Figure 8B:
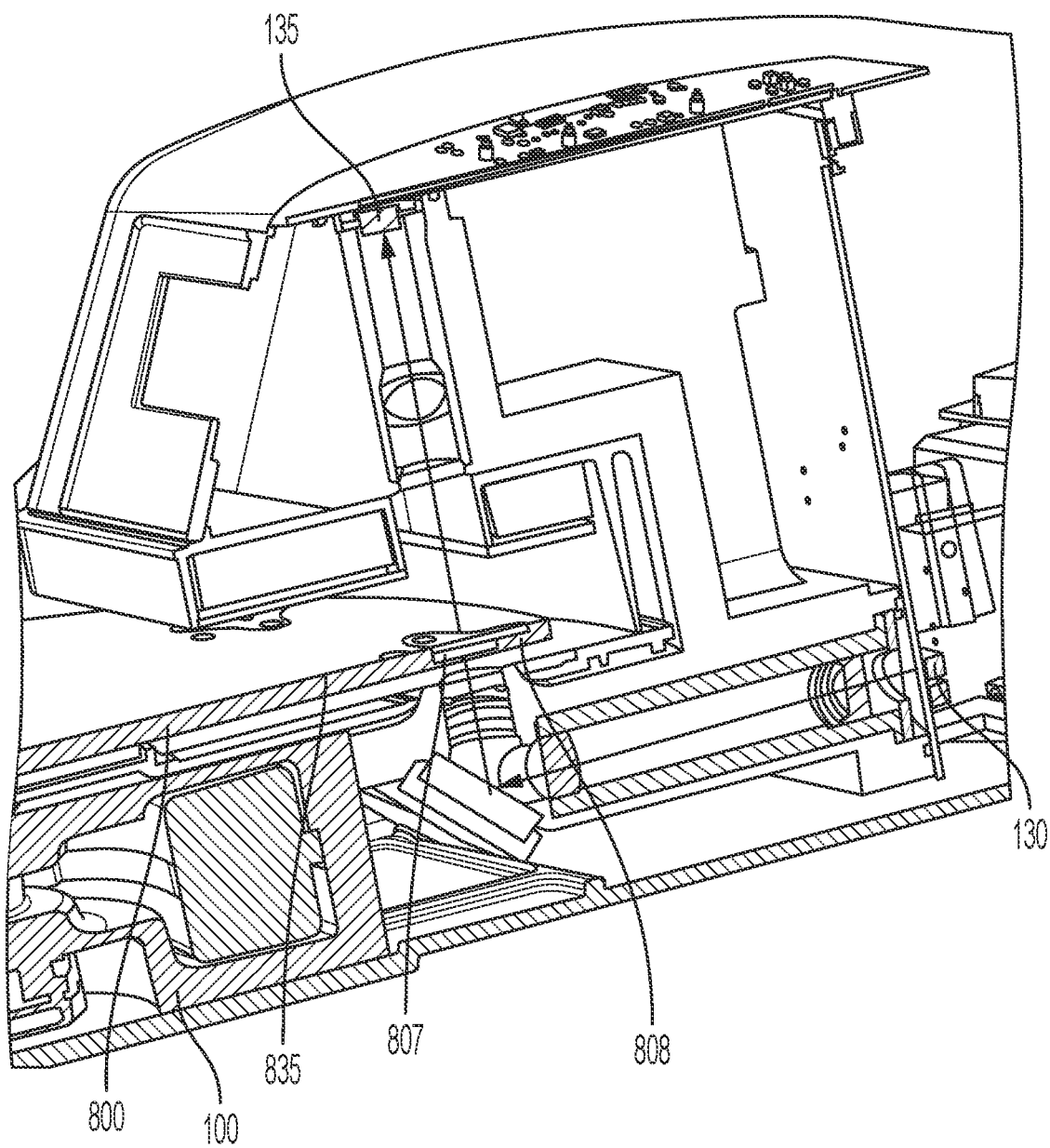
FIG. 8B is a cross-section of an illustrative reader and optical verification plate in accordance with an exemplary embodiment of the disclosed technology.
Figure 9B:
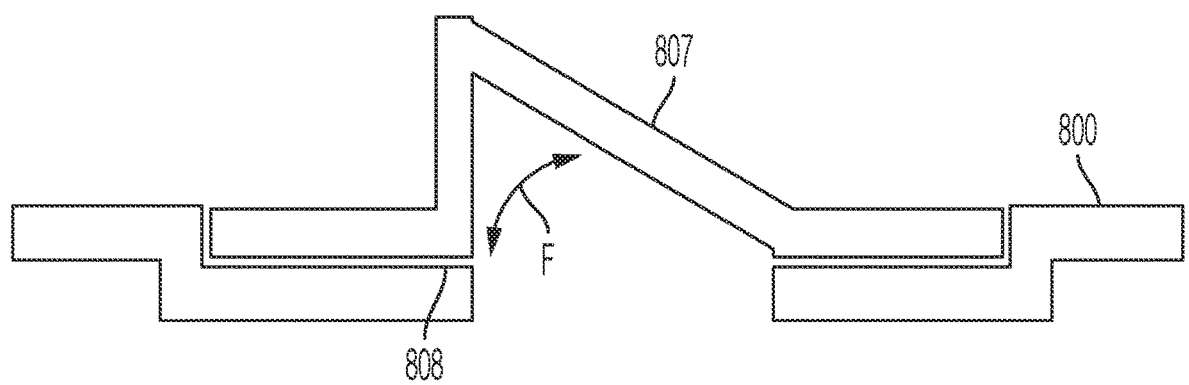
FIG. 9B is a cross-section of an illustrative optical verification plate in accordance with an exemplary embodiment of the disclosed technology.
Figure 9C:
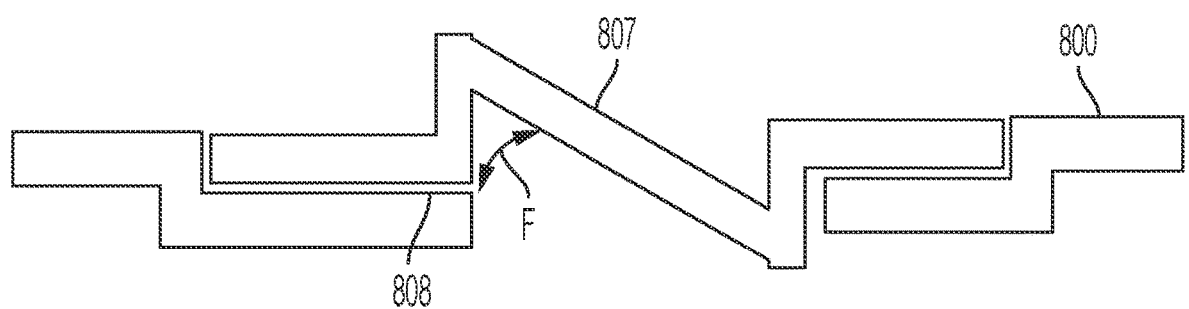
FIG. 9C is a cross-section of an illustrative optical verification plate in accordance with an exemplary embodiment of the disclosed technology.

The controller 305 has memory 307 and a processor 306. The battery 310 provides power to controller 305, temperature sensor 315, and temperature indicator 320 of temperature verification circuit 301 of TVP 300. Switch 325 turns temperature verification circuit 301 on and off, such as by controlling (starting and stopping) the flow of current between the battery 310 and the other components of the temperature verification circuit 301. Temperature sensor 315 measures temperature and provides a value of the measurement to the controller 305. Temperature sensor 315 may be an electronic temperature sensor, such as a thermistor, thermocouple, and/or resistance temperature detector. The radial distance between the center of TVP 300 and the temperature sensor 315 may also be equal to the first predetermined radial distance "A", which is the same as the distance between the spindle 105 and a center of an aperture 125 of an optical bench 120 of reader 100. Therefore, in an exemplary embodiment, the temperature sensor 315 of the TVP 300 measures the temperature of the body 335 of the TVP 300 at the same exact radial position from the center of the TVP 300 (and spindle 105) as the temperature sensors 115 of the reader 100 measure the temperature of the body 335 TVP 300. This is shown in FIG. 2C, where the field of view 117 of the reader temperature sensors 115 include the path of travel of the plate temperature sensor 315. As can be seen, the upper field of view 117a of the reader upper temperature sensor 115a includes the path of travel of the plate temperature sensor 315. Further, the lower field of view 117b of the reader lower temperature sensor 115b includes the path of travel of the plate temperature sensor 315.

The optical bench 120 has a light source 130 and a photodetector 135, for measuring the optical response of the reaction taking place within the reaction well of a reaction disc (reaction plate). The photodetector 135 can include a printed circuit board with power circuitry for providing power to photodetector 135 and also signal processing circuitry for digitizing the output of the photodetector 135, thereby providing a digitized output from photodetector 135. The light source 130 can include a printed circuit board with power circuitry for providing power to the light source 130. Controller 305 uses the temperature indicator 320 to optically represent the value of the temperature measured by temperature sensor 315. In an exemplary embodiment, the temperature indicator 320 may be comprised of at least one visual element 321 that may change state (on/off) to indicate a "1" or a "0". In an exemplary embodiment, the visual element 321 may be an LED light, as is shown in FIG. 2A, or an LCD, as is shown in FIG. 2B. In other embodiments, the temperature indicator 320 at least one visual element 321 may be comprised of at least one LED light and/or LCD. The temperature indicator 320 may be registered with the reader 100 to match the orientation of the TVP 300 with the timing of the measurements taken by the photodetector 135. This permits the reader 100 to take a measurement exactly as each visual element 321 of temperature indicator 320 passes under the photodetector 135.

In an exemplary embodiment, the temperature indicator 320 may be comprised of at least one LED light to optically represent the value, such as a single LED light or an array of LED lights. In an exemplary embodiment, the array of LED lights may be an array of 12 LED lights that flash to represent the temperature measurement value of the temperature sensor 315 in binary, which is readable by the photodetector 135 of reader 100. In some embodiments, when the bit value of the temperature measurement is less than or equal to the number of LED lights available to represent the temperature on temperature indicator 320, the temperature measurement value may be transmitted by the TVP 300 to the photodetector 135 of reader 100 during a single rotation of TVP 300. In other embodiments, when the value of the temperature measurement of temperature measurement sensor 315 is greater than a single bit number and the temperature indicator 320 has one LED light available to represent the temperature, the temperature measurement value may be transmitted by the TVP 300 to the photodetector 135 of reader 100 at a rate of one bit per rotation of the TVP 300.

In some exemplary embodiments, when the value of the temperature measurement of temperature sensor 315 is a 12-bit number and the temperature indicator 320 has 12 LED lights available to represent the temperature, the temperature measurement value may be transmitted by the TVP 300 to the photodetector 135 of reader 100 during a single rotation of TVP 300.

In other exemplary embodiments, when the value of the temperature measurement of temperature sensor 315 is a 12-bit number and the temperature indicator 320 has one LED light available to represent the temperature, the temperature measurement value may be transmitted by the TVP 300 to the photodetector 135 of reader 100 after 12 rotations of TVP 300, with one bit being transmitted per rotation of the TVP 300. In this embodiment, the rotational speed of the TVP 300 may be coordinated with the timing of the LED such that with each revolution, the next bit indicates ("ON" or "OFF").

In other exemplary embodiments, a temperature indicator 320 having multiple LED lights available to represent the temperature measurement of temperature sensor 315 may transmit the temperature measurement value to the photodetector 135 of reader 100 using more than one rotation of TVP 300. For example, a 12-bit temperature measurement value may be represented by two, three, four, or 6 LEDs, for which the 12-bit binary number would then be transmitted from temperature indicator 320 to photodetector 135 over the course of 6, 4, 3, or 2 revolutions of TVP 300. Further, temperature indicator 320 may even transmit a binary temperature measurement value that is not divisible by the number of LEDs of temperature indicator 320; for example, a 13-bit temperature measurement value could be represented by 5 LEDs over the course of three rotations of TVP 300.

In an exemplary embodiment, the temperature indicator 320 may be comprised of at least one LCD to optically represent the value, such as a single LCD or an array of 12 LCDs that change in opacity to represent the temperature measurement value of the temperature sensor 315 in binary. The variance in opacity of the LCD either permits the light generated by light source 130 to pass through the LCD and shine into photodetector 135, which may represent a "1", or reduces the amount of light generated by light source 130 from shining into photodetector 135 or blocks the light generated by light source 130 from shining into photodetector 135, which may represent a "0". In some embodiments, when the bit value of the temperature measurement is less than or equal to the number of LCDs available to represent the temperature on temperature indicator 320, the temperature measurement value may be transmitted by the TVP 300 to the photodetector 135 of reader 100 during a single rotation of TVP 300. In other embodiments, when the value of the temperature measurement of temperature measurement sensor 315 is greater than a single bit number and the temperature indicator 320 has one LCD available to represent the temperature, the temperature measurement value may be transmitted by the TVP 300 to the photodetector 135 of reader 100 at a rate of one bit per rotation of the TVP 300.

In an exemplary embodiment, the temperature indicator 320 may be comprised of at least one LCD to optically represent the value, such as a single LCD or an array of 12 LCDs that change in opacity to represent the temperature measurement value of the temperature sensor 315 in binary. The variance in opacity of the LCD either permits the light generated by light source 130 to pass through the LCD and shine into photodetector 135, which may represent a "1", or reduces the amount of light generated by light source 130 from shining into photodetector 135 or blocks the light generated by light source 130 from shining into photodetector 135, which may represent a "0". When the value of the temperature measurement of temperature sensor 315 is a 12-bit number and the temperature indicator 320 has a 12 LCDs available to represent the temperature, the temperature measurement value may be transmitted by the TVP 300 to the photodetector 135 of reader 100 during a single rotation of TVP 300, thereby transmitting the temperature value from the TVP 300 to the reader 100. When the value of the temperature measurement of temperature sensor 315 is a 12-bit number and the temperature indicator 320 has one LCD available to represent the temperature, the temperature measurement value may be transmitted by the TVP 300 to the photodetector 135 of reader 100 after 12 rotations of TVP 300, thereby transmitting the temperature value from the TVP 300 to the reader 100. In this embodiment, the rotational speed of the TVP may be coordinated with the timing of the LCD such that with each revolution, the next bit indicates ("PASSING LIGHT" or "BLOCKING LIGHT").

In other exemplary embodiments, a temperature indicator 320 having multiple LCDs lights available to represent the temperature measurement of temperature sensor 315 may transmit the temperature measurement value to the photodetector 135 of reader 100 using more than one rotation of TVP 300. For example, a 12-bit temperature measurement value may be represented by two, three, four, or 6 LCDs, for which the 12-bit binary number would then be transmitted from temperature indicator 320 to photodetector 135 over the course of 6, 4, 3, or 2 revolutions of TVP 300. Further, temperature indicator 320 may even transmit a binary temperature measurement value that is not divisible by the number of LCDs of temperature indicator 320; for example, a 13-bit temperature measurement value could be represented by 5 LCDs over the course of three rotations of TVP 300.

This transmission of the temperature value from the TVP 300 to the reader 100 using light, as opposed to radio frequencies, permits the TVP 300 to be used in areas where radio frequencies are highly regulated or potential radio interference may be present. Further, this TVP 300 design permits the use of the existing optical bench 120, which also eliminates the need to integrate an RF receiver or transceiver into the reader 100.

Turning to a method for measuring temperature 600 using the TVP 300, in 601, the method progresses to 605, when TVP 300 is activated. TVP 300 may be activated when switch 325 is moved to the "ON" position. In 605, TVP obtains at least one temperature measurement using temperature sensor 315 over a first predetermined length of time and sends the measurement value to controller 305. In an exemplary embodiment, at least one temperature measurement may be obtained during the first predetermined length of time using temperature sensor 315 and the values of the measurements may be provided to controller 305. Further, measurements may be obtained at a first recurring interval during the first predetermined length of time, when more than one temperature measurement is obtained and provided to controller 305. The temperature measurements obtained during the first predetermined length of time may be averaged by controller 305, when one or more temperature measurements are provided to controller 305 during the first predetermined length of time. In an exemplary embodiment, the first predetermined length of time may be about 5 seconds and the first recurring interval may be about 0.1 seconds.

In 610, the value of the at least one temperature measurement obtained in 405 is outputted (transmitted) by the controller 305 of the TVP 300 using temperature indicator 320 for a second predetermined length of time. In an exemplary embodiment, the second predetermined length of time may be about 0.4 seconds. The value may be an average of the temperature measurement values obtained during the first predetermined length of time. Prior to outputting, the controller 305 may convert the value from a numerical value to a binary value. In an exemplary embodiment, the numerical value may be converted to a 12-bit binary value and outputted using 12 LEDs of the temperature indicator 320. However, it is contemplated that the numerical value may be converted to a different binary resolution and may be outputted using a different number of LEDs or LCDs on the temperature indicator 320. The temperature indicator 320 and controller 305 may also output validation information, which informs the reader 100, that the measurement is valid. In an embodiment, the validation information may be an extra "1" bit at beginning and end of the 12-bit number, for a total of 14-bits, with only the 12-bits in the middle indicating the value of the temperature measurement. In some embodiments that output the temperature as a 12-bit number, plus the extra 2-bits for verification, the temperature indicator 320 may have 12 LEDs or LCDs, to enable the transmission of the measurement and verification information during a single rotation of the TVP, or may use a single LED or LCD, to enable the transmission of the measurement and verification information over 14 rotations of the TVP 300. The method then returns to 601 and progresses to 605, while the TVP 300 remains activated. In an exemplary embodiment, the TVP 300 remains activated while switch 325 remains in the "ON" position.

A block diagram of the components 106 of reader 100 that interact with reader controller 145 is shown in FIG. 1B. As can be seen, controller 145 is comprised of memory 119 and a CPU (processor) 118 to execute the program stored in memory 119. Controller interfaces with user interface 113, spindle 105, plate 103, optical bench 120, and reaction cavity environment augmenters 155. In some embodiments, user interface 113 may also interact with controller 145. In one embodiment, enclosure 101 may have at least one reaction cavity environmental augmenter, such as a heater 110 and/or temperature sensor 115 for regulating the temperature within reaction cavity 140 of enclosure 101 and plate 103. Plate 103 provides position information to controller 145. Optical bench 120 provides controller 145 with information regarding the intensity of light received by photodetector 135. Reaction cavity environment augmenter 155, such as temperature sensors 115, provide a measurement of the temperature of plate 103 at the location of the reaction wells on a reaction plate to controller 145, and controller 145 uses this information to determine whether heaters 110 should be activated within enclosure 101. User interface 113 may permit a user to provide controller 145 with test parameters and allows controller 145 to display test results to user. Spindle 105, having a motor, may provide position information to controller 116 and may also permit controller 145 to regulate the rotation of plate 103 through user interface 113.

Turning to a method for verifying the temperature measurement performance 700 of reader 100 (Temperature Verification Mode), in 701, the TVP 300 is activated, such as by moving a switch to the "ON" position, and placed in reader 100, and the TVP 300 measures and outputs the temperature at the temperature sensor 115 in accordance with the method of 600. As can be seen, TVP 300 measures a temperature of the body 335 of the TVP 300 as the TVP 300 is rotated by the spindle 105 of the reader 100. In 705, the reader 100 is placed in Temperature Verification mode via the user interface 113. In 710, the reader 100 spins up TVP 300 using spindle 105 and remains spinning while in Temperature Verification mode. The spinning of TVP 300 permits the testing of the reader temperature sensors 115, and heaters 110, in the same conditions in which they are used when a reaction plate is present in reader 100. In 715, the heaters 110 and reader temperature sensors 115 are activated by the reader controller 145 to heat and maintain the body 335 of the TVP 300 at the predetermined temperature.

In 720, once the body of the TVP has been maintained at the predetermined temperature for at least the first predetermined length of time, the reader 100 obtains a temperature measurement of the body of the TVP 300 using the reader temperature sensors 115, the TVP 300 obtains and outputs the temperature measurement value using the temperature indicator 320 in accordance with method 600, and the reader 100 receives the temperature measurement value of the TVP 300, and optionally the verification bits, using the optical bench 120. In an exemplary embodiment, the reader 100 may obtain a temperature measurement of a bottom surface 337 and/or top surface 336 on the body 335. In an exemplary embodiment, the temperature measurement value may be outputted from the TVP 300 in 12-bit binary format. Optionally, the temperature measurement value from the TVP 300 may be converted from binary to decimal and scaled for the measurement range of the temperature verification circuit 301 of TVP 300, such as by using the following formula:

$$\text{Converted Temperature Value} = LT + \frac{N}{4095}(UT - LT),$$

where:
NEW=the 12 bit temperature in Celsius received from the TVP 300;
UT=the upper temperature measurement value limit in Celsius of the TVP 300;
LT=the lower temperature measurement value limit in Celsius of the TVP 300.

In 725, the reader 100 calculates and compares the difference between the temperature measurement value obtained from the TVP 300, also known as the TVP temperature measurement value, with the temperature measurement value obtained from the reader temperature sensors 115, also known as the reader temperature measurement value. In 730, if the difference between the TVP temperature measurement value and the reader temperature measurement value is less than or equal to a predetermined temperature difference threshold, the calibration of the reader temperature sensors 115 are verified and the user may be informed through user interface 113. If the difference between the TVP temperature measurement value and the reader temperature measurement value is greater than a predetermined temperature difference threshold, the calibration of the temperature sensors 115 is not verified, and the user is informed of the temperature sensor calibration error through user interface 113. In one embodiment, the predetermined temperature difference threshold may be about 1° C. In another embodiment, the predetermined temperature difference threshold may be about 0.5° C. In yet another embodiment, the predetermined temperature difference threshold may be about 0.1° C.

In some embodiments, steps 715-725 may be repeated to obtain the temperature difference between the TVP 300 and the reader 100 at additional predetermined temperature points. For example, the temperature difference between the TVP 300 and the reader 100 may be evaluated at both 22° C. and 37° C.

In optional step 730, a calibration factor may be applied to the value of the output of the reader temperature sensors 115, such as through user interface 113, to bring the temperature sensors 115 back into calibration. When only a single predetermined temperature point is used, a single-point offset may be used to obtain the calibration factor for calibrating the temperature sensors 115. When two predetermined temperature points are employed, a straight-line interpolation may be performed to obtain the calibration factor for calibrating the temperature sensors 115. When three or more predetermined temperature points are employed, other interpolation methods may be used, such as a mathematical regression to obtain the calibration factor for calibrating the temperature sensors 115. In an exemplary embodiment, the mathematical regression can be polynomial regression.

Turning to FIGS. 1A-2C and 8A-11, An optical verification plate (OVP) 800 may be used to verify that the optical bench 120 of the reader is operating correctly. The OVP 800 has a plurality of apertures 805 located along the periphery of a body 801 of OVP 800. The center of each aperture 805 is located a first predetermined radial distance "A" away from the center of the body 801 of OVP 800, which permits the apertures 805 to line up with the light source 130 and photodetector 135 of optical bench 120, such that the light produced by photodetector 135 can pass through apertures 805 and the intensity of the light can be measured by photodetector 135. In an embodiment, a plurality of the apertures 805 may be filtered apertures 806, with some of the filtered apertures having neutral density filters 810 (neutral density filtered aperture 811) and one or more apertures having a wavelength filter (wavelength filtered aperture 850), which may include at least one of a short pass filter 815 (short pass filtered aperture 816), a long pass filter 820 (long pass filtered aperture 821), bandpass filter (bandpass filtered aperture), and/or stopband filter (stopband filtered aperture).

In an exemplary embodiment, the filtered apertures 806 of OVP 800 may be comprised of at least one wavelength filtered aperture 850 and seven (7) neutral density filtered apertures 811. In an exemplary embodiment, each of the seven neutral density filtered apertures of OVP 800 may have a different optical density (darkness) value. In an exemplary embodiment, the neutral density filter optical density values may be between about 0.01-3. In another exemplary embodiment, the neutral density filter optical density values may be between about 0.01-2. In a further exemplary embodiment, the neutral density filter optical density values may be between about 0.1-1.2. In a further exemplary embodiment, the neutral density filter optical density values may be between about 0.1-1.15. The filtered apertures 806 may be spaced apart by a second predetermined distance "B", when travelling counter-clockwise around the OVP 800.

In an exemplary embodiment, at least one wavelength filtered aperture 850 may be comprised of one long pass filtered aperture 821 and one short pass filtered aperture 815. In an exemplary embodiment, the short pass filter 815 may have about a 400 nm cutoff, and the long pass filter 820 may have about a 410 nm cutoff. In an exemplary embodiment, the light source 130 of the optical bench may output light having a wavelength of about 405+/−5 nm. By examining the output of the light source 130 that passes through the at least one wavelength filtered aperture 850, such as the short pass filter 815 and/or the long pass filter 820, using photodetector 135, the reader 100 may ascertain whether the spectrum of the light outputted by light source 130 is within specification, or has drifted.

Figure 10:
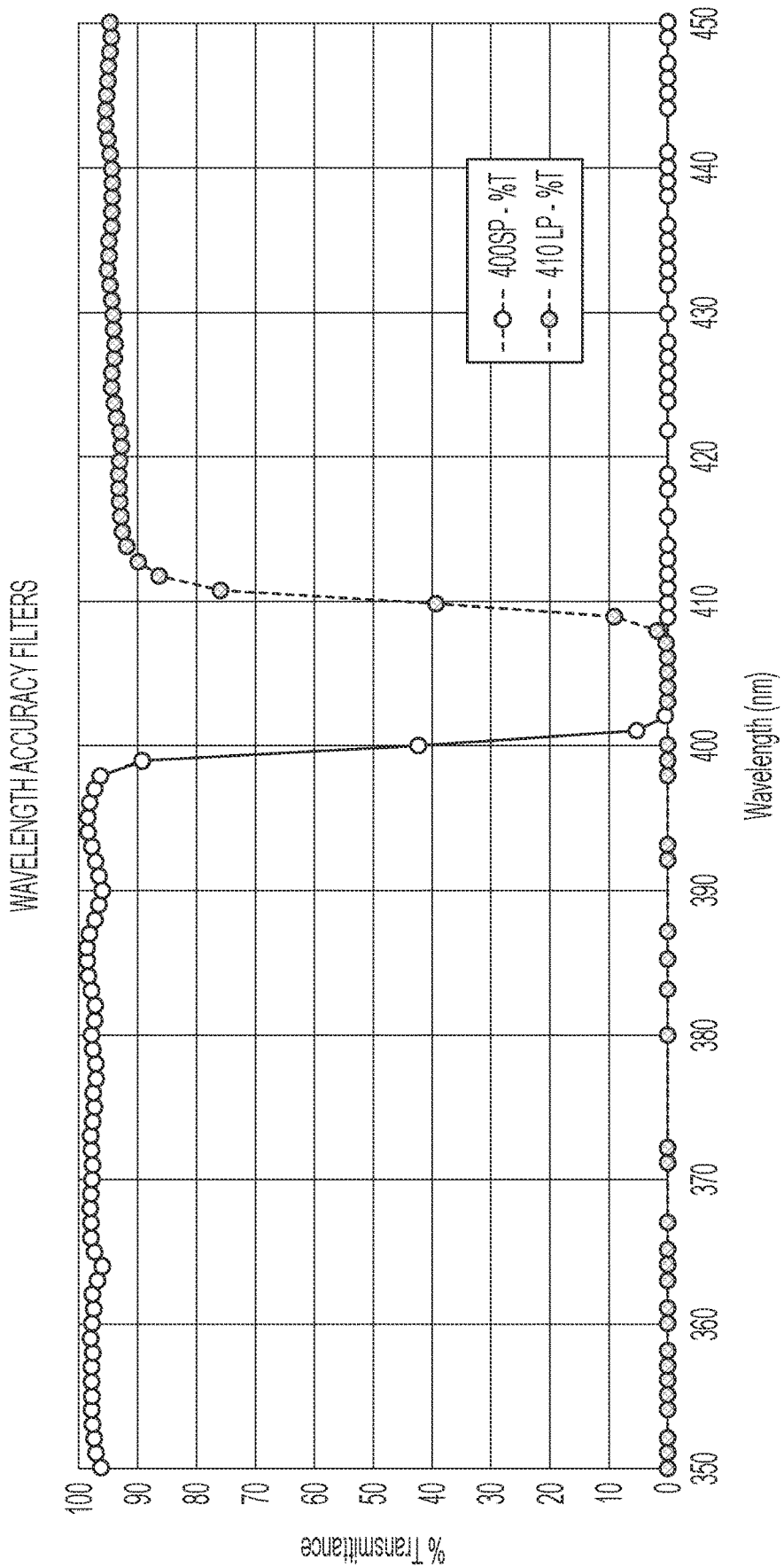
FIG. 10 is a plot of transmissibility vs wavelength for an illustrative short pass filter and long pass filter in accordance with an exemplary embodiment of the disclosed technology.

The spectral transmissibility curves for short pass filter 815 and long pass filter 820 are shown in FIG. 10. As can be seen, the short pass filter 815 and long pass filter 820 have a very narrow transition band (band between the stop band and passband). Accordingly, it is contemplated that some embodiments of OVP 800 may use a single stopband or bandpass filter with a sufficiently narrow transition band to replace both of short pass filter 815 and long pass filter 820.

In an embodiment one or more filters 807 may be mounted on OVP 800 to form an angle of zero (0) degrees with respect to the top surface 835 of the OVP 800. Stated alternatively, one or more filters 807 may be flat on the top surface 835 of the OVP 800. Thereby one or more filters 807 may be perpendicular (90°) with respect to the direction of the light travelling from the light source 130 to the photodetector 135 of the optical bench 120.

In other embodiments, one or more filters 807 may be mounted such that filter 807 forms a first predetermined angle "F" with respect to the top surface 835 of the OVP 800. In an exemplary embodiment, the first predetermined angle "F" may be between about 0 degrees and about 30 degrees. In another exemplary embodiment, the first predetermined angle "F" may be about 30 degrees.

In another embodiment, one or more filters 807 may be mounted below the top surface 835 of the OVP 800 on a filter bed 808. The one or more filters may be mounted to the OVP 800, such that they form an angle of zero (0) degrees with respect to the filter bed 808 of the OVP 800. Thereby one or more filters 807 may be perpendicular (90°) with respect to the direction of the light travelling from the light source 130 to the photodetector 135 of the optical bench 120.

In other embodiments, one or more filters 807 may be mounted such that filter 807 forms a first predetermined angle "F" with respect to the filter bed 808 of the OVP 800. In an exemplary embodiment, the first predetermined angle "F" may be between about 0 degrees and about 45 degrees. In another exemplary embodiment, the first predetermined angle "F" may be about 30 degrees.

The OVP 800 may also have an incident aperture 825 and a registration aperture 830, both of which are unfiltered. All the apertures 805 may have the same radius, except for the registration aperture 830, which may have a smaller radius. In an exemplary embodiment, the incident aperture 825 may be located between the first filtered aperture 806a and the registration aperture 830. Further, in an exemplary embodiment, the registration aperture 830 may be located between the incident aperture 825 and the last filtered aperture 806b. The distance between the first filtered aperture 806a and the incident aperture 825 may be a second predetermined distance "C". The distance between the incident aperture 825 and the registration aperture 830 may be a third predetermined distance "D". The distance between the registration aperture 830 and the last filtered aperture 806b may be a fourth predetermined distance "E". In an exemplary embodiment, the second predetermined distance may be about 16 mm, the third predetermined distance may be about 4 mm, and the fourth predetermined distance may be about 74 mm. It is contemplated that in some embodiments, reader 100 may use a registration pattern 845 to determine the angle of rotation of the OVP 800. In an exemplary embodiment, the registration pattern 845 may include registration aperture 830. In another exemplary embodiment, the registration pattern 845 may include both the registration aperture 830 and incident aperture 825.

In an exemplary embodiment, reader 100 may be programmed to recognize the registration pattern 845 rotating across the optical bench 120, and then know that a predetermined number of filtered apertures 806 will be the next apertures 805 to cross the optical bench. The values and sequence of the filters of the filtered apertures 806 may be programmed into reader 100, thereby permitting processor 118 of reader 100 to analyze the performance of the optical bench 120 and output the results to the user through the user interface 113.

In some exemplary embodiments, the OVP 800 may have a balancer 840 for balancing the OVP 800 while it is spinning in the reader 100. The balancer 840 may include, but is limited to, one or more of a counterweight, weight reduction recess and/or weight reduction hole.

Figure 11A:
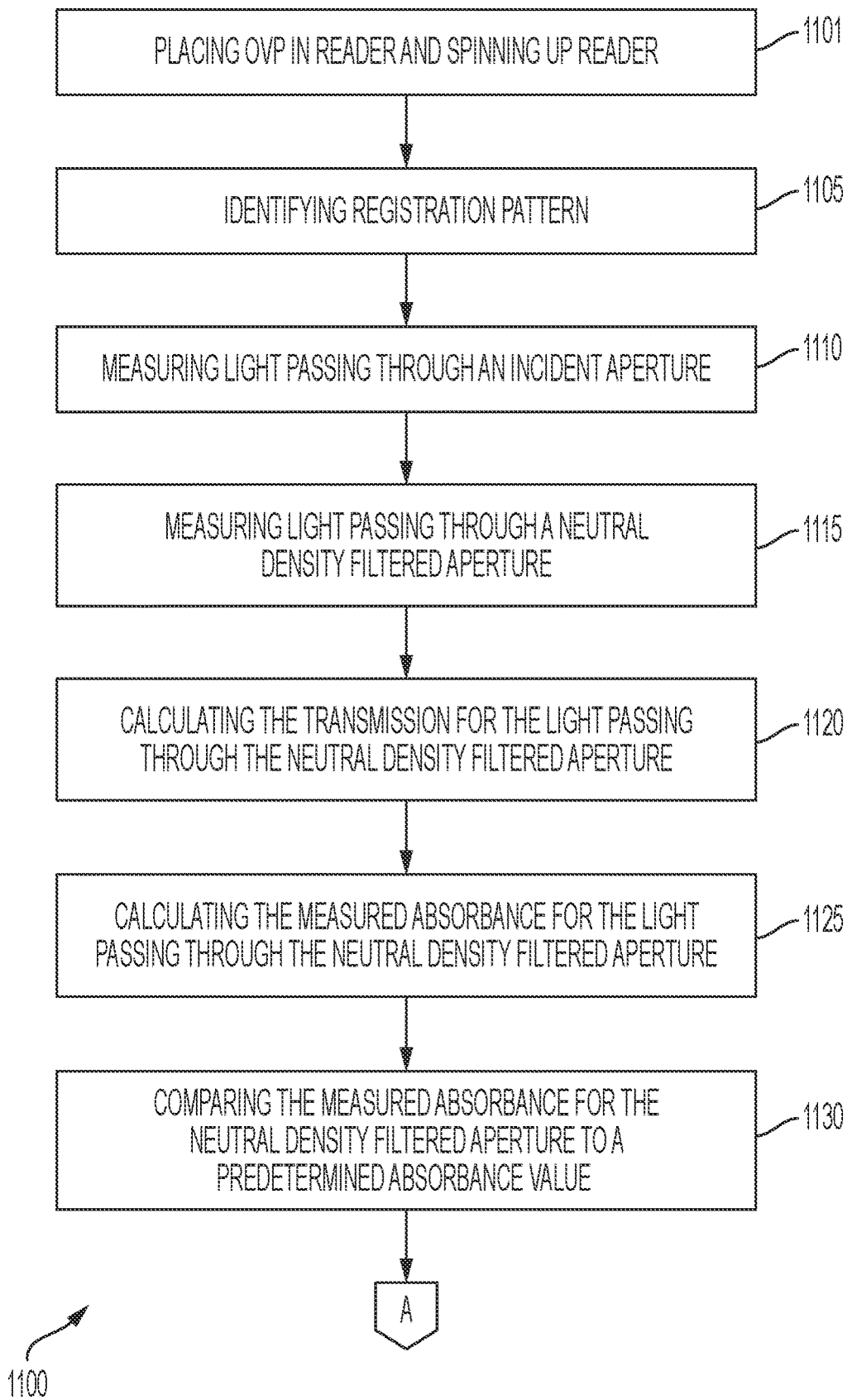
FIGS. 11A-B are a flow diagram of an example method of verifying reader optical measurements using an optical verification plate in accordance with an exemplary embodiment of the disclosed technology.
Figure 11B:
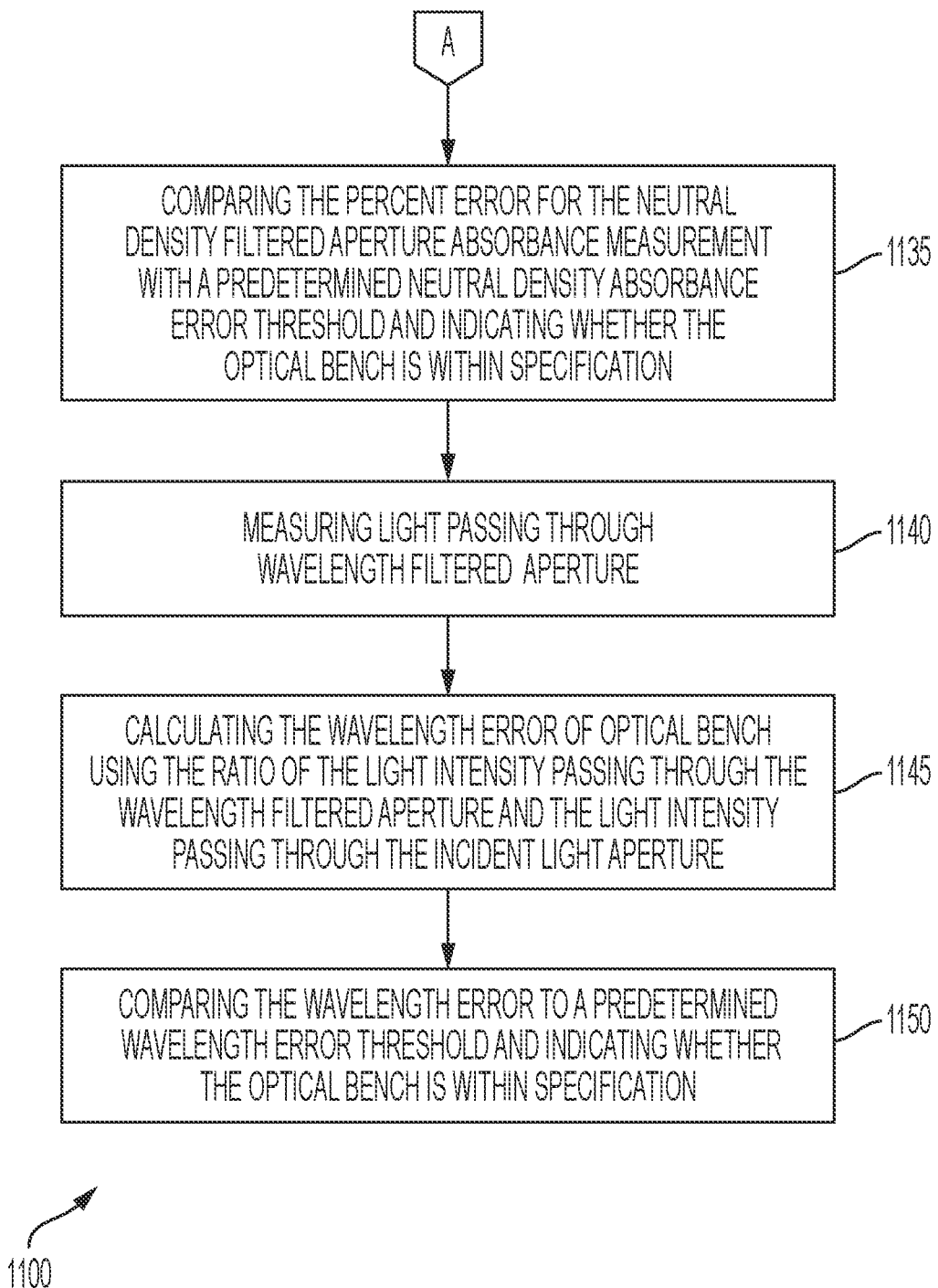

FIG. 11A-B shows an exemplary method 1100 of measuring and verifying the optical performance of the optical bench 120 of the reader 100 using the OVP 800 (measuring absorbance, or optical density, and error). In block 1101, the OVP 800 is placed in reader 100 and reader 100 spins OVP 800. In block 1105, reader 100 identifies registration pattern 845 on OVP using optical bench 120. This registration permits the reader 100 to time the sampling by the optical bench 120 at the exact moment an aperture 805 passes through the optical bench. In block 1110, the reader passes light through incident aperture 825 using the light source 130 and measures the intensity of the light received by the photodetector 135. The value of this measurement is stored as incident light ($I_i$) in memory 119.

In block 1115, the reader passes light through at least one neutral density filtered aperture 811 using the light source 130 and measures the intensity of the light received by the photodetector 135. The value of this intensity measurement ($I_{fN}$) is stored in memory 119, with N being incremented once for each neutral density filtered aperture 811. The actions of block 1115 may be repeated until values for each neutral density filtered aperture 811 has been measured and stored in memory 119.

In block 1120, the transmission ($T_N$) is calculated by processor 118 and stored in memory 119 for at least one neutral density aperture 811, using the formula $T_N=(I_{fN}/I_i)$. The actions of block 1120 may be repeated until transmission values for each neutral density filtered apertures 811 has been calculated by processor 118 and stored in memory 119.

In block 1125, the measured absorbance ($A_{mN}$) is calculated by processor 118 and stored in memory 119 for at least one neutral density filtered aperture 811, using the formula $A_{mN}=-\log_{10}(T_N)$, with valid $T_N$ values being between 0 and 1. The actions of block 1125 may be repeated until measured absorbance values for each neutral density filtered aperture 811 has been calculated by processor 118 and stored in memory 119.

In block 1130, the measured absorbance ($A_{mN}$) for at least one neutral density filtered aperture 811 is compared with a predetermined absorbance value ($A_{pN}$), a percent error is calculated using processor 118, and the absorbance percent error is stored in memory 119, using the formula $AError_N = (A_{mN} - A_{pN})/A_{pN}$. In an exemplary embodiment the predetermined absorbance value may be the actual certified absorbance of the neutral density filter at the neutral density filtered aperture 811. The actions of block 1130 may be repeated until an absorbance percent error values for each neutral density filtered aperture 811 has been calculated by processor 118 and stored in memory 119.

In block 1135, the percent error for at least one neutral density filtered aperture absorbance measurement 811 ($AError_N$) is compared to a predetermined neutral density absorbance error threshold ($AError_p$) by the processor 118. The processor 118 may inform the user if the predetermined neutral density error threshold has been exceeded, thereby indicating that the optical bench 120 of the reader 100 is out of specification. The processor 118 may inform the user via the user interface 113. In an exemplary embodiment, the predetermined neutral density error threshold may be about 5%. The actions of block 1135 may be repeated until a comparison for each neutral density filtered aperture 811 has been completed with processor 118, and having results stored in memory 119, and outputted to the user via user interface 113.

In block 1140, the reader passes light through at least one wavelength filtered aperture 850 using the light source 130 and measures the value of the intensity of the light received by the photodetector 135. The value of this measurement and the value is stored as intensity wavelength measurement $I_{WN}$, with N being incremented once for each wavelength filtered aperture 850. The actions of block 1115 may be repeated until values for each wavelength filtered aperture 850 has been measured and stored in memory 119.

In block 1145, the wavelength error of the optical bench ($WError_N$) is calculated by evaluating the ratio of at least one measurement of incident light intensity passing through a wavelength filtered aperture 850 ($I_{WN}$) and the measurement of incident light intensity passing through the incident light aperture 825 ($I_i$) by processor 118, using the formula $WError_N = I_{WN}/I_i$. This wavelength error of the optical bench is stored in memory 119. The actions of block 1145 may be repeated until wavelength error values for each wavelength filtered aperture 850 have been calculated by processor 118 and stored in memory 119.

In block 1150, the processor 118 compares the wavelength error for each wavelength filtered aperture 850 to a predetermined wavelength error threshold and informs the user if the predetermined wavelength threshold has been exceeded, thereby indicating that the optical bench 120 of the reader 100 is out of specification. The predetermined error threshold may be a predetermined wavelength error summation threshold or an predetermined individual wavelength error threshold. The processor may inform the user via the user interface 113. In an exemplary embodiment, the sum of the wavelength errors must not exceed about (must not be greater than) 5%, stated alternatively, the predetermined wavelength error summation threshold may be about 5%. In another embodiment, any individual wavelength error threshold may be about 2.5%, stated alternatively, the predetermined individual wavelength error threshold may be about 2.5%. In another embodiment, the predetermined wavelength error threshold may correspond with the output of light source 130 having a wavelength greater than about 410 nm and/or less than about 400 nm. The actions of block 1150 may be repeated until a comparison for each wavelength filtered aperture 850 has been completed by processor 118, results stored in memory 119, and outputted to the user via user interface 113.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

The invention claimed is:

1. A temperature verification plate (TVP) for a bacterial endotoxin reader comprising:
    a body configured to be placed on a spindle of said reader and rotated by said spindle;
    said body having a temperature verification circuit comprising a temperature sensor and a temperature indicator;
    said temperature sensor being configured to measure a temperature of said body, when rotated by said spindle of said reader;
    said temperature indicator being configured to optically represent a value of said temperature measured by said temperature sensor, wherein said temperature indicator is readable by an optical bench of said reader;
    wherein said temperature indicator is at least one light emitting diode (LED) and/or at least one liquid crystal display (LCD); wherein said temperature indicator represents said value of said temperature as a binary number.

2. The TVP of claim 1, wherein said temperature sensor is an electronic temperature sensor, a thermistor, a thermocouple and/or a resistance temperature detector.

3. The TVP of claim 1, wherein said binary number determines a resolution of said temperature measured by said temperature sensor, wherein said binary number has two or more verification bits.

4. The TVP of claim 3, wherein said binary number is a 12 digit number.

5. The TVP of claim 3, wherein said temperature indicator is a single LED, 12 LEDs, 14 LEDs, a single LCD, 12 LCDs, or 14 LCDs.

6. The TVP of claim 1, wherein said temperature verification circuit further comprising a battery and a switch; said battery provides power to said temperature verification circuit; said switch permits current to flow from said battery, when said switch is in an "ON" position, and prevents the flow of current from said battery, when said switch is in an "OFF" position.

7. The TVP of claim 1, wherein said temperature sensor obtains temperature measurements at a first recurring interval during a first predetermined length of time; said temperature indicator outputs an average of said temperature measurements.

8. The TVP of claim 7, wherein said first predetermined length of time is about 5 seconds and said first recurring interval is about 0.1 seconds.

* * * * *